(12) United States Patent
Suzuki et al.

(10) Patent No.: US 7,613,389 B2
(45) Date of Patent: Nov. 3, 2009

(54) IMAGE TAKING APPARATUS AND ASSEMBLING METHOD THEREOF

(75) Inventors: Yusuke Suzuki, Hachioji (JP); Masae Sato, Machida (JP); Susumu Yamaguchi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 450 days.

(21) Appl. No.: 11/499,906

(22) Filed: Aug. 4, 2006

(65) Prior Publication Data

US 2007/0047938 A1    Mar. 1, 2007

(30) Foreign Application Priority Data

| Aug. 8, 2005 | (JP) | 2005-229412 |
| Sep. 20, 2005 | (JP) | 2005-271904 |
| Sep. 20, 2005 | (JP) | 2005-271905 |
| Oct. 4, 2005 | (JP) | 2005-291230 |
| Oct. 14, 2005 | (JP) | 2005-300808 |

(51) Int. Cl.
*G03B 3/00* (2006.01)

(52) U.S. Cl. .................. 396/89; 396/348; 396/349; 348/335; 348/345

(58) Field of Classification Search .................. 396/89, 396/439, 463, 464, 348, 349, 345; 348/207.99, 348/208.12, 335; 353/100, 101; 359/819, 359/822; 362/455

See application file for complete search history.

(56) References Cited

U.S. PATENT DOCUMENTS

| 6,590,721 | B2* | 7/2003 | Onda | 359/819 |
| 6,885,508 | B2* | 4/2005 | Yamaguchi et al. | 359/717 |
| 2002/0012533 | A1* | 1/2002 | Onozuka et al. | 396/89 |
| 2003/0193605 | A1* | 10/2003 | Yamaguchi | 348/335 |
| 2005/0030408 | A1* | 2/2005 | Ito et al. | 348/340 |
| 2005/0105194 | A1* | 5/2005 | Matsui et al. | 359/772 |
| 2005/0264670 | A1* | 12/2005 | Yamaguchi et al. | 348/335 |
| 2005/0276588 | A1* | 12/2005 | Tsutsumi | 396/55 |
| 2006/0098968 | A1* | 5/2006 | Ito et al. | 396/85 |

* cited by examiner

*Primary Examiner*—W B Perkey
*Assistant Examiner*—Warren K Fenwick
(74) *Attorney, Agent, or Firm*—Cohen Pontani Lieberman & Pavane LLP

(57) ABSTRACT

The image taking lens has the minimum effective diameter lens whose effective diameter is minimum, and the maximum effective diameter lens whose effective diameter is maximum on the most image side, and in the space generated in the minimum effective diameter lens periphery by the difference of the outer diameter of the minimum effective diameter lens and the outer diameter of the maximum effective diameter lens, at least a part of an actuator for driving focusing lens group moving at the time of focusing is arranged.

14 Claims, 30 Drawing Sheets

FIG. 14 (a)
FIG. 14 (b)
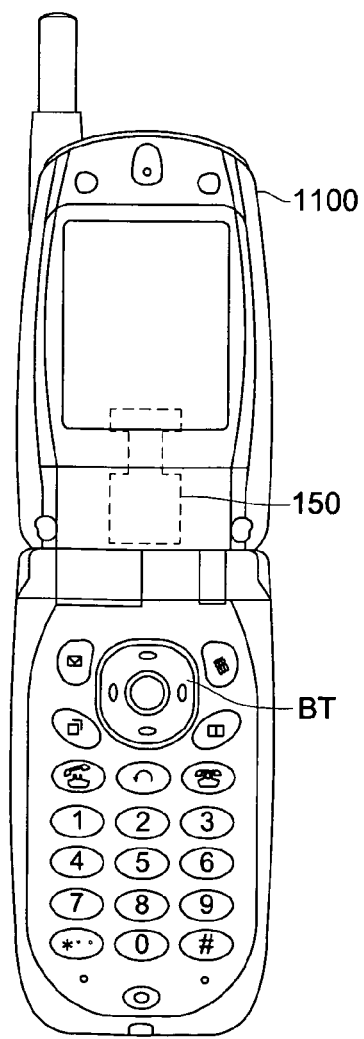
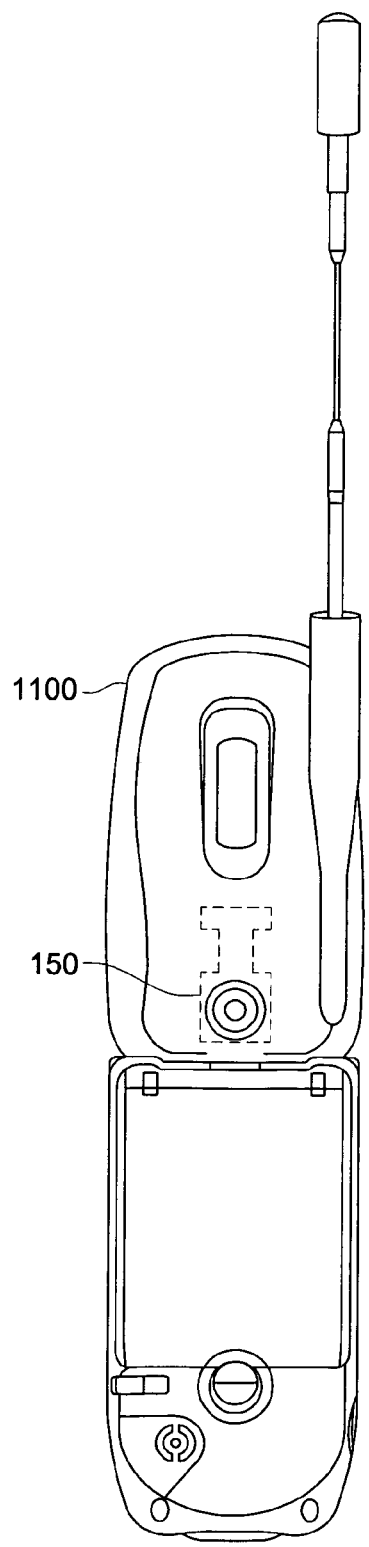

Focusing

IMAGE TAKING APPARATUS AND ASSEMBLING METHOD THEREOF

RELATED APPLICATIONS

The present application is based on Japanese Patent Application No. 2005-229412 filed on Aug. 8, 2005, Japanese Patent Application No. 2005-271904 filed on Sep. 20, 2005, Japanese Patent Application No. 2005-271905 filed on Sep. 20, 2005, Japanese Patent Application No. 2005-291230 filed Oct. 4, 2005 and Japanese Patent Application No. 2005-300808 filed on Oct. 14, 2005, the contents of which are incorporated herein by reference.

FIELD OF THE INVENTION

The present invention relates to a small sized image taking apparatus using a solid-state image sensor such as a CCD type image sensor or CMOS type image sensor, and particularly relates to an image taking apparatus provided with an auto-focus mechanism.

BACKGROUND OF THE INVENTION

Following the technical advantage offering of the image taking apparatus using the solid-state image sensor such as CCD (Charge Coupled Device) type image sensor or CMOS (Complementary Metal Oxide Semiconductor)type image sensor, a cellular phone in which the image taking apparatus providing with an auto-focus mechanism (hereinafter, called an AF mechanism)is mounted, is spread. Further, for these image taking apparatus, the requirement for further size-reduction is enhanced. As the image taking apparatus having such an AF mechanism, it is disclosed, for example, in Patent Document 1, and Patent Document 2.

[Patent Document 1] JP-A No. 2004-347890. (Hereinafter, JP-A refers to Japanese Patent Publication Open to Public Inspection)

[Patent Document 2] JP-A No. 2005-128392.

However, in the image taking apparatus disclosed in Patent Document 1, the outer diameter of lens groups constituting the image taking lens is almost equal, and because a drive means for driving the lens, is arranged on its outside, the dimension in the diameter direction is increased. Hereupon, because the mounting space is limited as in the case where for example, the image taking apparatus is mounted in the cellular phone, in order to avoid the interference with other parts, there is an actual condition that further size-reduced image taking apparatus is required. Further, when a plurality of lenses or glass lenses are driven as the focusing lens group, a stronger actuator becomes necessary. Further, also in the image taking apparatus disclosed in Patent Document 2, because a drive means for driving the lens is arranged on the outside of the lens groups constituting the image taking lens, the dimension in the diameter direction becomes large.

SUMMARY OF THE INVENTION

In view of problems of such a conventional technology, the present invention is attained, and the object of the present invention is to provide the image taking apparatus having a further compact structure while the focusing operation is made possible.

According to the first embodiment of the present invention, an image taking apparatus providing with: an image taking lens having a plurality of lenses; a solid-state image sensor; a substrate on which the solid-state image sensor is mounted, and which has terminals for external connection sending and receiving the electric signal; a casing formed of a light shielding member fixed to the substrate in such a manner that the periphery of the solid-state image sensor and the image taking lens is surrounded; and a part or whole of the image taking lens is moved along the optical axis at the time of focusing, and the above object can be attained by an image taking apparatus in which the image taking lens has the minimum effective diameter lens whose effective diameter is minimum, and the maximum effective diameter lens whose effective diameter is maximum, on the most image side, and in a space generated on the periphery of the minimum effective diameter lens due to the difference between the outer diameter of the minimum effective diameter lens and the outer diameter of the maximum effective diameter lens, at least one part of the actuator for driving the focusing lens group moving at the time of focusing, is arranged.

According to the first embodiment of the present invention, because in a space generated on the periphery of the minimum effective diameter lens due to the difference between the outer diameter of the minimum effective diameter lens and the outer diameter of the maximum effective diameter lens, at least one part of the actuator for driving the focusing lens group moving at the time of focusing, is arranged, the actuator having the high driving force can be assembled in while the outer dimension of the image taking apparatus is suppressed small.

Herein, "a space generated on the periphery of the minimum effective diameter lens due to the difference between the outer diameter of the minimum effective diameter lens and the outer diameter of the maximum effective diameter lens", includes "a space generated, as the result, on the periphery of the minimum effective diameter lens due to the difference between the outer diameter of the minimum effective diameter lens and the outer diameter of the maximum effective diameter lens, and for example, when the minimum effective diameter lens and the maximum effective diameter lens are held by the holding member together, a space generated on the periphery of the minimum effective diameter lens due to the difference between the outer diameters of the holding member" corresponds to "a space generated on the periphery of the minimum effective diameter lens due to the difference between the outer diameter of the minimum effective diameter lens and the outer diameter of the maximum effective diameter lens".

BRIEF DESCRIPTION OF THE DRAWINGS

FIG. 14 is a view showing a condition that the image taking apparatus 150 is equipped in a cellular phone 1100 as a portable terminal.

DETAILED DESCRIPTION OF THE INVENTION

Figure 1:
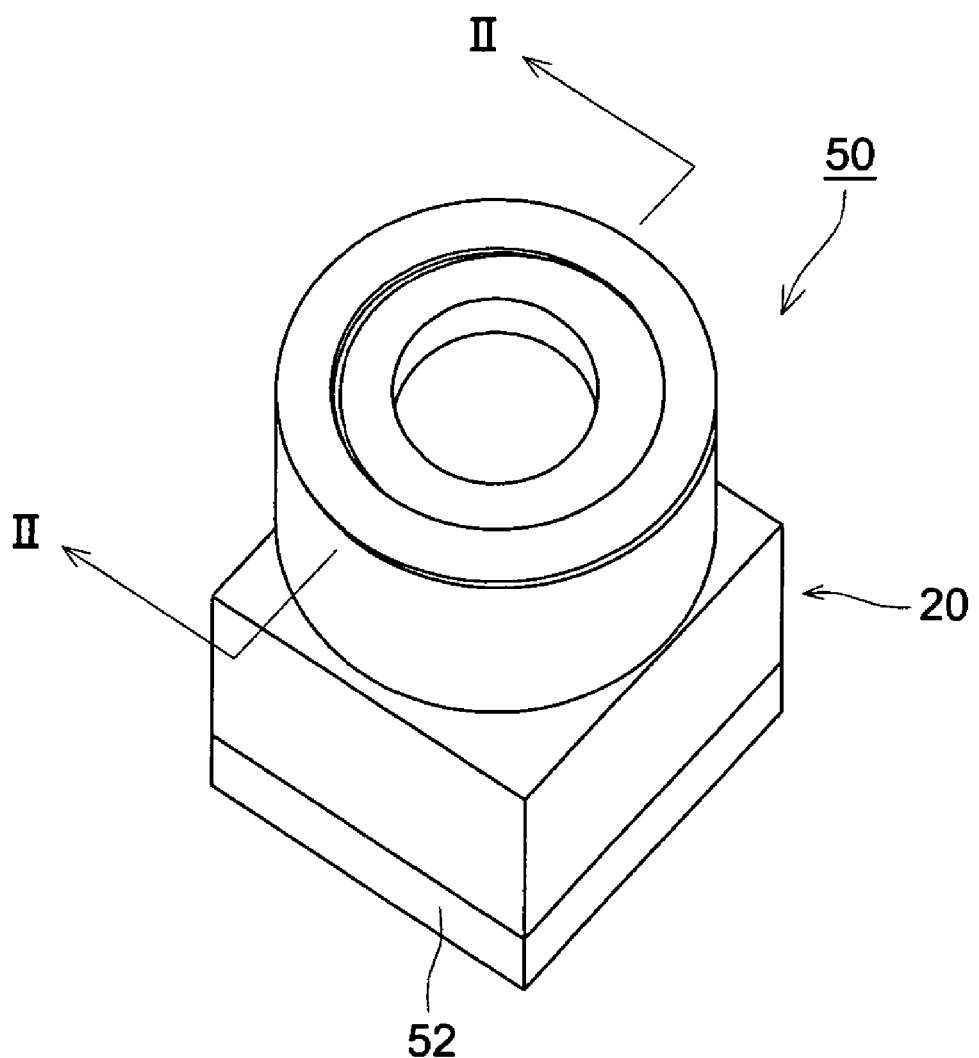
FIG. 1 is a perspective view of an image taking apparatus 50 according to the present embodiment.
Figure 2:
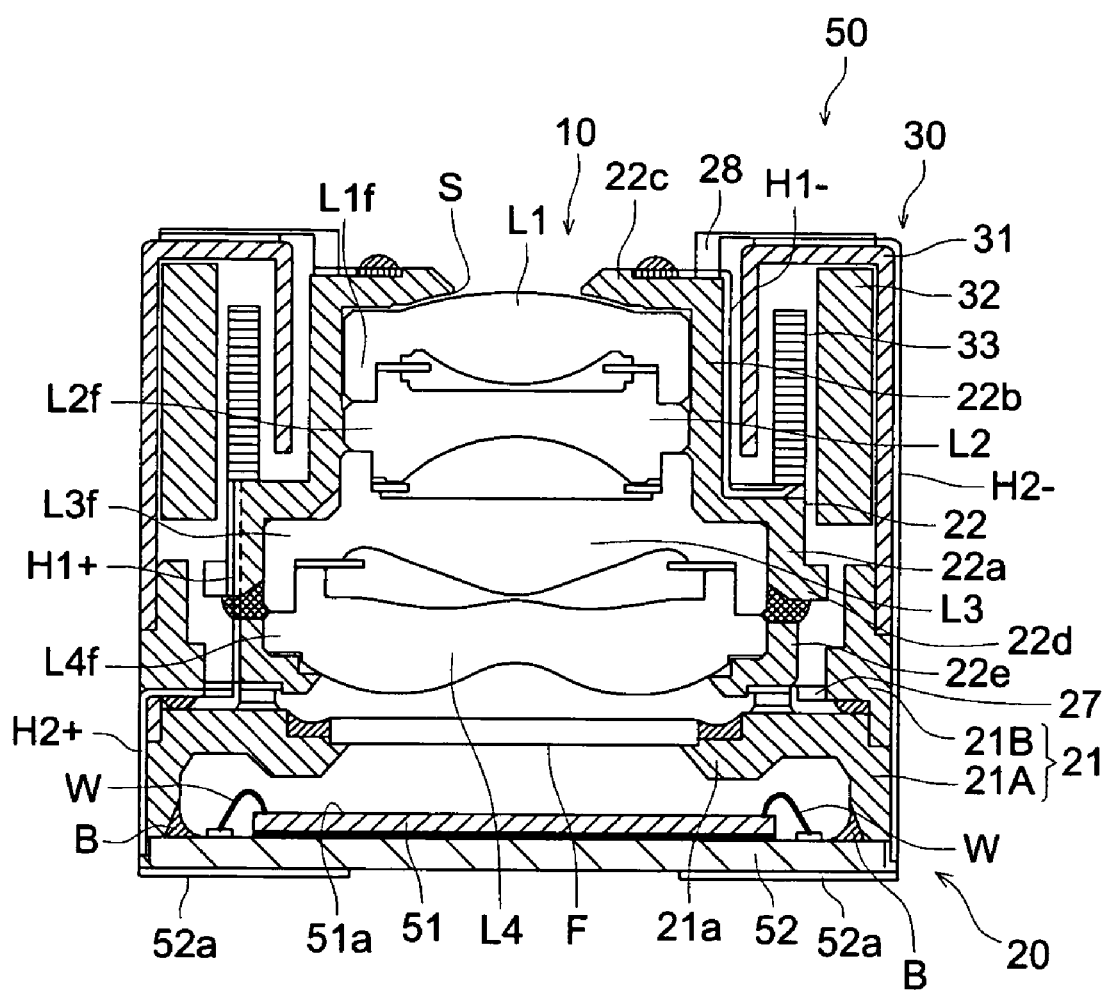
FIG. 2 is a sectional view in which the image taking apparatus 50 of FIG. 1 is cut along the surface including II-II line.

Based on the drawings, the first embodiment of the present invention will be described below. FIG. 1 is a perspective view of an image taking apparatus 50 including the image taking apparatus according to the first embodiment, and FIG. 2 is a view in which the image taking apparatus 50 of FIG. 1 is cut on the surface including II-II line and viewed in the arrow mark direction.

The image taking apparatus 50 is provided with: a CMOS type image sensor 51 as a solid-state image sensor having a photo-electric conversion section 51a; an image taking lens 10 which image-forms the subject image on the photo-electric conversion section 51a of this image sensor 51; an IR cut filter F arranged between the image sensor 51 and the image taking lens 10; a substrate 52 which holds the image sensor 51 on its surface and has terminals for the external connection 52a for sending and receiving its electric signal on the rear surface; an assembling casing 20 for supporting the image taking lens; an actuator 30 for driving a focusing lens group (called also focus actuator); and they are integrally formed. Hereupon, the height Δ in the optical axis direction of the present image taking apparatus 50 is less than 10 mm.

In the image sensor 51, the photo-electric conversion section 51a as a light receiving section in which pixels (photo-electric conversion element) are 2-dimensionally arranged is formed on the central part of the plane of the light receiving side, and on its periphery, the logic part (not shown) is formed. Such a logic part includes signal processing circuits for outputting the signal (for example, YUV signal or RGB signal) of a desired image format. Further, in the vicinity of outer edge of the plane of the light receiving side, a many number of pads (drawing is neglected) are arranged, and connected to the substrate 52 through a wire W. The image sensor 51 converts the signal electric charge from the photo-electric conversion section 51a into a desired image signal, and outputs to a predetermined circuit on the substrate 52 through the wire W. Hereupon, the image sensor is not limited to the CMOS type image sensor, but the other element such as CCD may be used.

The substrate 52 has a many number of pads for signal transmission provided on the surface, and this is connected to the wire W from the image sensor 51, and further, connected to the terminal 52a for external connection.

The substrate 52 is connected to the external circuit (for example, the control circuit which is owned by a higher ranked apparatus in which the image taking apparatus is equipped), through the terminal 52a for external connection, and it is made possible to receive from the external circuit, the supply of the voltage for driving the image sensor 51 or a clock signal, or to output a desired image format signal to the external circuit.

The assembling casing 20, comprises the light shield member, arranged on the periphery of the image taking lens 10 is arranged in such a manner that the image sensor 51 is surrounded, and the lower cylinder 21A whose lower end is adhered to the substrate 52 by using the adhesive agent B and the outer cylinder 21 having the short cylindrical upper cylinder 21B affixed to the upper part of the lower cylinder 21A is included.

In FIG. 2, to the flange section 21a extendedly existing from the inner periphery in the optical axis orthogonal direction, an IR cut filter F is attached.

A moving cylinder 22 movably arranged to the assembling casing 20, has a large cylinder section 22a, a small cylinder section 21b connected to its upper end, a small flange section 21c formed on its upper end, a large flange section 21d extendedly existing from the lower end of the large cylindrical section 22a in the radial direction, and a holder member 21e adhered by the adhesive agent B like as to block the large cylinder section 22a, and from the object side, in the order of the first lens L1, the second lens L2, the third lens L3, the fourth lens L4, they are fixedly involved and held. A central aperture of the small flange section 21c is a stop S.

A flange part L1f of the first lens L1 is pushed and engaged like as to involve the upper part of the flange part L2f of the second lens L2. Further, the upper part of the flange part L3f of the third lens L3 is pushed and engaged like as to involve the lower part of the flange part L2f of the second lens L2. Further, the lower part of the flange part L3f of the third lens L3 is pushed and engaged like as to involve the flange part L4f of the fourth lens L4. The outer diameters of the first lens L1 and the second lens L2 are slightly smaller than the outer diameter of the third lens L3. Accordingly, when the lenses L1-L3 are assembled in the small cylinder section 21b in such a manner that the first lens L1 is pushed to the small flange section 22c, the optical axis of the lens to the moving cylinder 22, is accurately positioned by the engagement of the inner peripheral surface of the small cylinder section 21b with the outer diameter of the flange part L3f, and by the engagement of mutual flange sections, the optical axis of the third lens L3, and the optical axes of the first lens L1 and the second lens L2 are accurately positioned. The optical axis of the fourth lens L4 is accurately positioned to the optical axis of the third lens L3 by the engagement of mutual flange parts.

In the external direction of the optical axis orthogonal direction of the small cylinder part 21b of the moving cylinder 22, a cylindrical actuator 30 is arranged. The actuator 30 comprises a coil 33 affixed to the large cylinder part 22a and extendedly existing in the optical axis direction, a magnet 32 arranged like as to involve the coil 33 at above of the upper cylinder 21B, and a yoke 31 which supports the magnet 32, and whose lower end is affixed to the upper cylinder 21B, in such a manner that it covers from above to the inner periphery of the coil 33. Hereupon, it is also allowable that the magnet 32 is affixed to the moving cylinder 22 and the coil 33 is affixed to the upper cylinder 21B.

In a spring member 27 of the shape in which mutual donut discs whose diameters are different, are connected by shifting the phase of the connection position, its outer periphery side is fixed to the vicinity of the lower end of the upper cylinder section 21B, and its inner periphery side is fixed to the lower surface of the holding member 22e. On the one hand, in a spring member 28 having the similar shape to the spring member 27, its outer periphery side is fixed to the upper surface of the yoke 31, and the inner periphery side is fixed to the upper end of the moving cylinder 22. Spring members 27, 28 generate the energizing force corresponding that the moving cylinder 22 is moved in the optical axis direction.

A plus terminal of the coil 33 of the actuator 30 is connected to the spring member 27 through the wiring H1+ passing the large cylinder section 22a of the moving cylinder 22, and extendedly existing on the outer wall of the holding member 22e. Further, the spring member 27 is connected to the substrate 52 through H2+ penetrating the outer wall of the upper cylinder 21B and extendedly existing on the outer wall of the lower cylinder 21A. Because the drive principle of the voice coil motor is well known from Tokkai No.2005-128392 or the like, it is neglected, however, by a magnetic force generated when the electric power is supplied to the coil 33 through the spring members 27, 28, wiring H1+, H2+, H1−, H2− from the outside, the coil 33 can be dislocated to the magnet 32 corresponding to the supplied electric power.

The image taking lens 10 has in order from the object side, the aperture stop S, the first lens (the minimum effective diameter lens) L1 which has positive refractive power and whose convex surface faces the object side, the second lens L2 having negative refractive power, the third lens having positive refractive power, the fourth lens (the maximum effective diameter lens) L4 having negative refractive power. In the present embodiment, the lenses L1, L2, L3, L4 compose the focusing lens group (called also movable lens ), however, because compared to the lens L4, the outer diameter of the lenses L1-L3 is made small, by using this outer diameter difference, the large sized actuator 30 can be mounted.

In this image taking lens 10, the aperture stop S, each of lenses L1, L2, L3, L4 are made optical system and the lens 10 image forms the subject image onto the solid-state image sensor. The aperture stop S is a member for determining the F-number of the whole system of the image taking lens.

In between the image taking lens 10 and the image sensor 51, the IR cut filter F held by the flange part 21a of the outer cylinder 21 is a member formed, for example, almost rectangular, or circular.

Further, between the first lens L1 and the second lens L2, and between the second lens L2 and the third lens L3, the light shielding masks SM are arranged, thereby, it is prevented that unnecessary light is incident on the outside of the effective diameter of the lenses L3, L4 which are near the solid-state image sensor, and the generation of the ghost or flare can be suppressed.

According to the first embodiment, because the yoke 31 of the actuator 30 is arranged in a space generated by the outer diameter difference of the first lens L1 and the fourth lens L4, while the compact structure is maintained, the increase of the number of windings of the coil 33 or the increase of the length can be intended, and the drive force can be enhanced.

Figure 3:
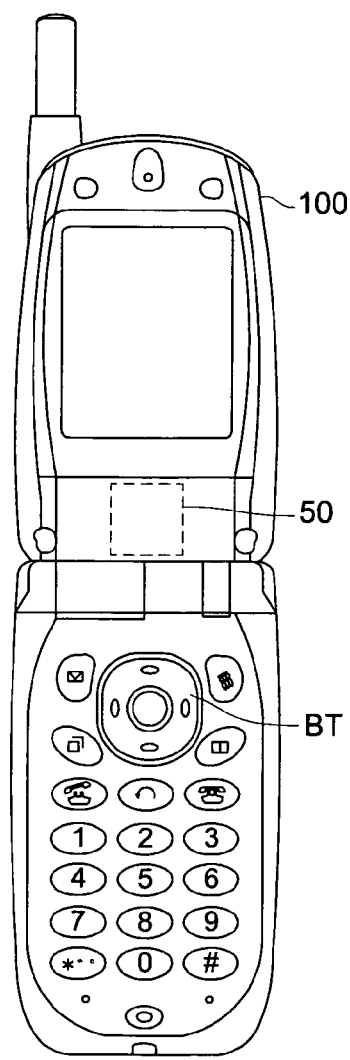
FIG. 3 is a view showing a condition that the image taking apparatus 50 is equipped in a cellular phone 100 as a portable terminal.
Figure 3:
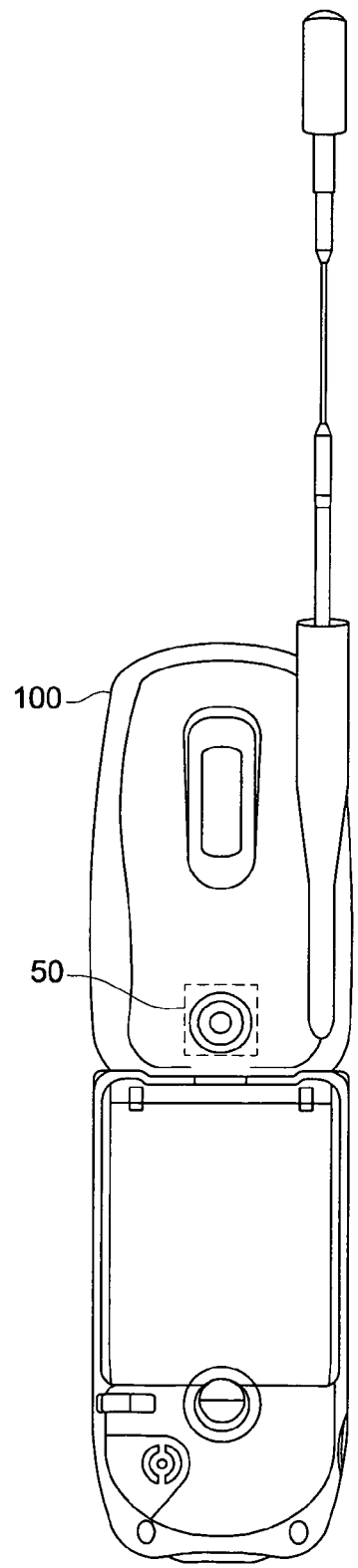

A use embodiment of the above image taking apparatus 50 will be described. FIG. 3 is a view showing a condition that the image taking apparatus 50 is equipped in the cellular phone 100 as the portable terminal. Further, FIG. 4 is a control block diagram of the cellular phone 100.

In the image taking apparatus 50, for example, the end surface on the object side of the outer cylinder 21 in the image taking lens is provided on the rear surface of the cellular phone 100 (the liquid crystal display section side is a front), and arranged so that it is placed at a position corresponding to the below of the liquid crystal display section.

The terminal 52a for external connection of the image taking apparatus 50 is connected to the control section 101 of the cellular phone 100, and outputs the image signal such as the brightness signal or color difference signal to the control section 101 side.

Figure 4:
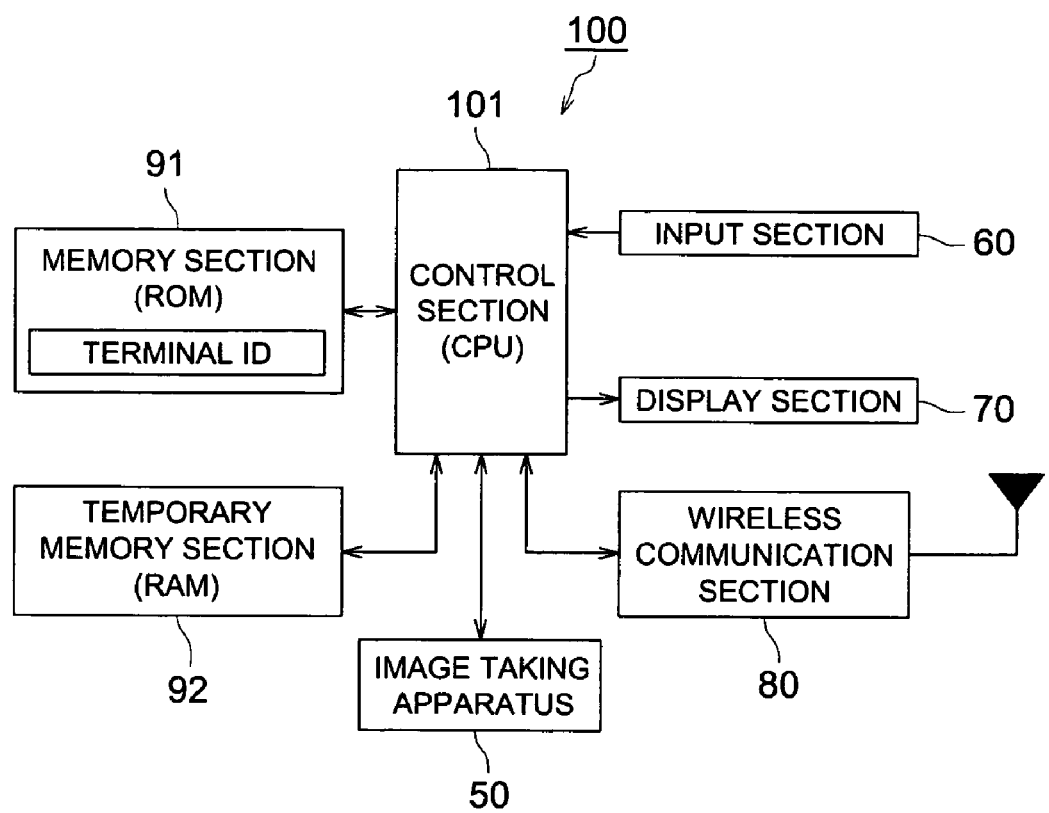
FIG. 4 is a control block diagram of the cellular phone 100.

On the one hand, the cellular phone 100 has, as shown in FIG. 4, the control section (CPU) 101 for controlling in charge of each section and for carrying out the program correcponding to the each processing, the input section 60 for supporting and inputting the number or the like by keys, the display section 70 for displaying, other than a predetermined data, the image-taken image or video picture, the wireless communication section 80 for realizing each kind of information communication between the external server, the memory section (ROM) 91 for storing the necessary data such as the system program of the cellular phone 100, each kind of processing program, and the terminal ID, and the temporary storing section (RAM) 92 used as the working area for temporarily storing the each kind of processing program or data carrying out by the control section 101 or the image taking data by the image taking apparatus 50.

When the photographer having the cellular phone 100 faces the optical axis of the image taking lens 10 of the image taking apparatus 50 to the object, the image signal is taken into the image sensor 51, and for example, when the image surface AF processing or the like is carried out, the focus slippage can be detected. Because the control section 101 supplies the electric power to the actuator 30 so that the lenses L1-L4 are driven in the direction in which this focus slippage is solved, the electric power is supplied to the coil 33 from the terminal 52a for external connection through the wiring H1+, H2+, H1−, H2−. At this time, the magnetic flux density is enhanced by the yoke 31 arranged on the periphery of the magnet 32, and the electric power can be effectively converted into the magnetic force. When the magnetic force generated hereby and the energizing force of the deformed spring members 27, 28 are balanced, because the lenses L1-L4 can be moved to the optimum focus position together with the moving cylinder 22 and held, the adequate autofocus operation can be realized. Hereupon, when the drive force of the actuator 30 is eliminated by the interruption of the electric power supply, the moving cylinder 22 returns to the original position.

Releasing is conducted when the photographer presses the button BT shown in FIG. 3, by a desired shutter chance, and the image signal is taken into the image taking apparatus 50. The image signal inputted from the image taking apparatus 50 is transmitted to the control system of the above cellular phone 100, and stored in the memory section 92, or displayed on the display section 70, further, transmitted to the external portion as the video information through the wireless communication section 80.

Figure 6:
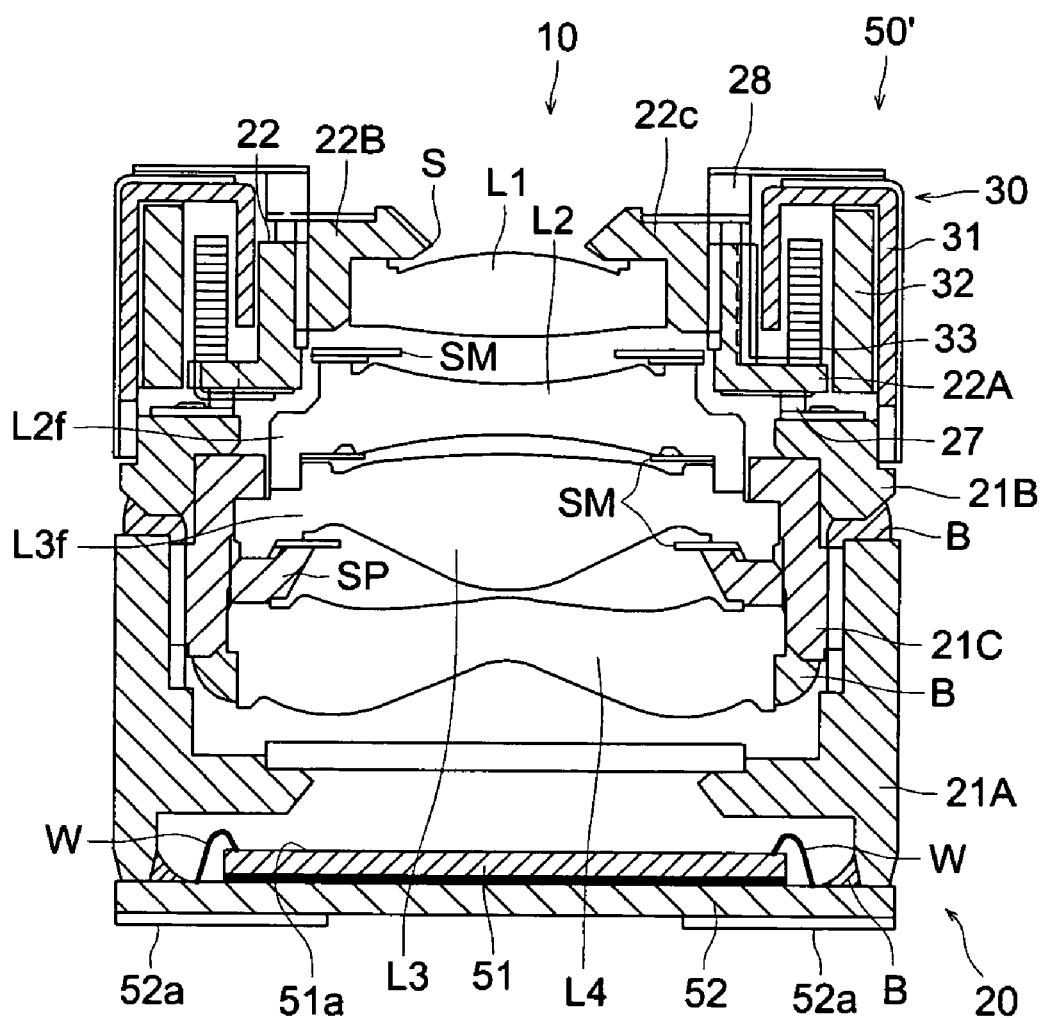
FIG. 6 is a sectional view similar to FIG. 2, of the image taking apparatus 50' according to the second embodiment, which can be used for the cellular phone 100.

FIG. 6 is a sectional view of the image taking apparatus 50' according to the second embodiment. The assembling casing 20 comprises the light shielding member is arranged so as to surround the image sensor 51, and the lower cylinder 21A in which to the substrate 52, the lower end is adhered by using the adhesive agent B, the outer cylinder 21 comprises the short cylindrical upper cylinder 21B affixed to the upper portion of the lower cylinder 21A, and the inner cylinder 21C which is screwed and affixed so that the optical axis position can be adjusted in the inner portion of the optical axis orthogonal direction of the lower cylinder 21A, and the inner cylinder 21C fixed by the upper cylinder 21B is included. The inner cylinder 21C fixedly involves, in order of the second lens L2, the third lens L3, the fourth lens (the maximum effective diameter lens) L4, from the object side, and holds.

The moving cylinder 22 movably arranged to the assembling casing 20, has the movable outer cylinder 22A and the moving inner cylinder 22B which is the optical axis position adjustably screwed in its inner periphery. The moving inner cylinder 22B holds the first lens (the minimum effective diameter lens) L1 which is a focusing lens group, and the central aperture of the flange section 21c formed in its upper end is a stop S.

The flange part L2f of the second lens L2 is contacted and engaged in such a manner that it involves the upper part of the flange part L3f of the third lens L3. Further, when the third lens L3 and the fourth lens L4 are engaged with the inner peripheral surface of the inner cylinder 21C with a spacer SP between them, they are positioned in the optical axis orthogonal direction.

In the outside of the optical axis orthogonal direction of the moving outer cylinder 22A of the moving cylinder 22, a cylindrical actuator 30 is arranged. The actuator 30 is comprises the coil 33 affixed to the flange part of the moving outer cylinder 22A and extendedly existing in the optical axis direction, the magnet 32 arranged in such a manner that it involves the coil 33 above the upper cylinder 21B, and the yoke 31 which supports the magnet 32 and whose lower end is affixed to the upper cylinder 21B in such a manner that it covers from above to the inner periphery of the coil 33.

In a spring member 27 of the shape in which mutual donut discs whose diameters are different, are connected by shifting the phase of the connection position, its outer periphery side is fixed to the upper surface of the upper cylinder section 21B, and its inner periphery side is fixed to the lower surface of the moving outer cylinder 22A. On the one hand, in a spring member 28 having the similar shape to the spring member 27, its outer periphery side is fixed to the upper surface of the yoke 31, and the inner periphery side is fixed to the flange section 21c of the moving inner cylinder 22B. Spring members 27, 28 generate the energizing force corresponding that the moving cylinder 22 is moved in the optical axis direction. For the structure other than that, because it is the same as in the above embodiment, the same sign is given and the description is neglected.

When a predetermined electric power is supplied to the coil 33 from the not shown power source, the magnetic flux density is enhanced by the yoke 31 arranged around the magnet 32, the electric power can be effectively converted into the magnetic force. When the magnetic force generated hereby and the energizing force of the deformed spring members 27, 28, are balanced, because the lens L1 can be moved to the optimum focus position together with the moving cylinder 22, and held, the adequate auto-focus movement can be realized. Hereupon, when the drive force of the actuator 30 is eliminated by the interruption of the power supply, the moving cylinder 22 is returned to the original position.

Examples of lens which can be used for the above first embodiment and the second embodiment will be shown below. Signs used for each example are as follows.

f: Focal distance of the whole system of image taking lenses
fB: Back focus
F: F number
2Y: Diagonal line length (=DL) of the rectangular effective pixel area of the solid-state image sensor
R: Radius of curvature
D: Surface interval on axis
Nd: Refractive index to d-line of the lens material
vd: Abbe's number of the lens material The shape of aspheric surface in each example, is expressed like that the apex of the surface is the original point, X-axis is determined in the optical axis direction, the height in the perpendicular direction to the optical axis is h, and it is expressed by the following [Math 1].

$$X = \frac{h^2/R}{1+\sqrt{1-(1+K)h^2/R^2}} + \sum A_i h^i \qquad [\text{Math 1}]$$

Where, $A_i$: I-order aspheric surface coefficient
R: Radius of curvature
K: Conical constant (Example 1 of the Image Taking Lens)

Lens data of Example 1 will be shown in Table 1, Table 2. Hereupon, after this (including the lens data of table), the exponent of 10 (for example, $2.5 \times 10^{-3}$) is expressed by using E (for example, 2.5 E-03).

TABLE 1 f = 4.69 mm, fB = 0.64 mm, F = 3.29, 2Y = 5.63 mm

| Surface number | R(mm) | D(mm) | Nd | νd |
|---|---|---|---|---|
| Aperture stop | ∞ | 0.00 | | |
| 1 | 3.268 | 1.05 | 1.53180 | 56.0 |
| 2 | -2.759 | 0.10 | | |
| 3 | 16.098 | 0.60 | 1.58300 | 30.0 |
| 4 | 1.823 | 0.70 | | |
| 5 | -10.205 | 1.14 | 1.53180 | 56.0 |
| 6 | -1.500 | 0.10 | | |
| 7 | 3.580 | 0.72 | 1.53180 | 56.0 |
| 8 | 1.129 | A(variable interval) | | |
| 9 | ∞ | 0.50 | 1.51633 | 64.1 |
| 10 | ∞ | | | |

(Variable interval A)

| | |
|---|---|
| Object distance ∞: | A = 0.63 mm |
| Object distance 100 mm: | A = 0.86 mm |

TABLE 2

Aspheric surface coefficient

The first surface

K = -1.80260E+00
A4 = -1.71940E-02
A6 = 2.50620E-03
A8 = -2.07910E-02
A10 = 7.60130E-03
The 2$^{nd}$ surface K = -1.97880E+00
A4 = -1.82320E-03
A6 = -1.97520E-02
A8 = 1.23810E-02
A10 = -6.58980E-03
The 3$^{rd}$ surface K = 1.70680E+01
A4 = -3.53790E-02
A6 = 9.89520E-03
A8 = 1.58730E-02
A10 = -7.75780E-03
The 4$^{th}$ surface K = -2.08070E+00
A4 = -2.37480E-02
A6 = 1.54200E-02
A8 = -5.14230E-04
A10 = 2.69460E-03
A12 = -1.44930E-03
The 5$^{th}$ surface K = 5.00000E+01
A4 = 5.43910E-02
A6 = -3.13790E-02
A8 = 9.67990E-03
A10 = -1.63390E-03
A12 = 1.53390E-04

TABLE 2-continued

Aspheric surface coefficient

The 6$^{th}$ surface

K = -5.58260E+00
A4 = -2.20270E-02
A6 = 1.37180E-02
A8 = -4.29380E-03
A10 = 1.32090E-03
A12 = -1.66480E-04
The 7$^{th}$ surface K = -2.57760E+00
A4 = -9.77100E-02
A6 = 2.02750E-02
A8 = -7.36560E-04
A10 = -1.38440E-04
A12 = 8.84750E-06
The 8$^{th}$ surface K = -5.03900E+00
A4 = -5.85520E-02
A6 = 1.33490E-02
A8 = -2.37190E-03
A10 = 2.64880E-04
A12 = -1.24590E-05

The variable interval A in the table is a variable interval for focusing the object from an infinite far point to the nearest distance. When a value of this A is changed (that is, the aperture stop S and the first lens L1—the forth lens L4 are integrally fed to the object side), the arbitrary subject can be focused from infinite point to the nearest distance.

Figure 7:
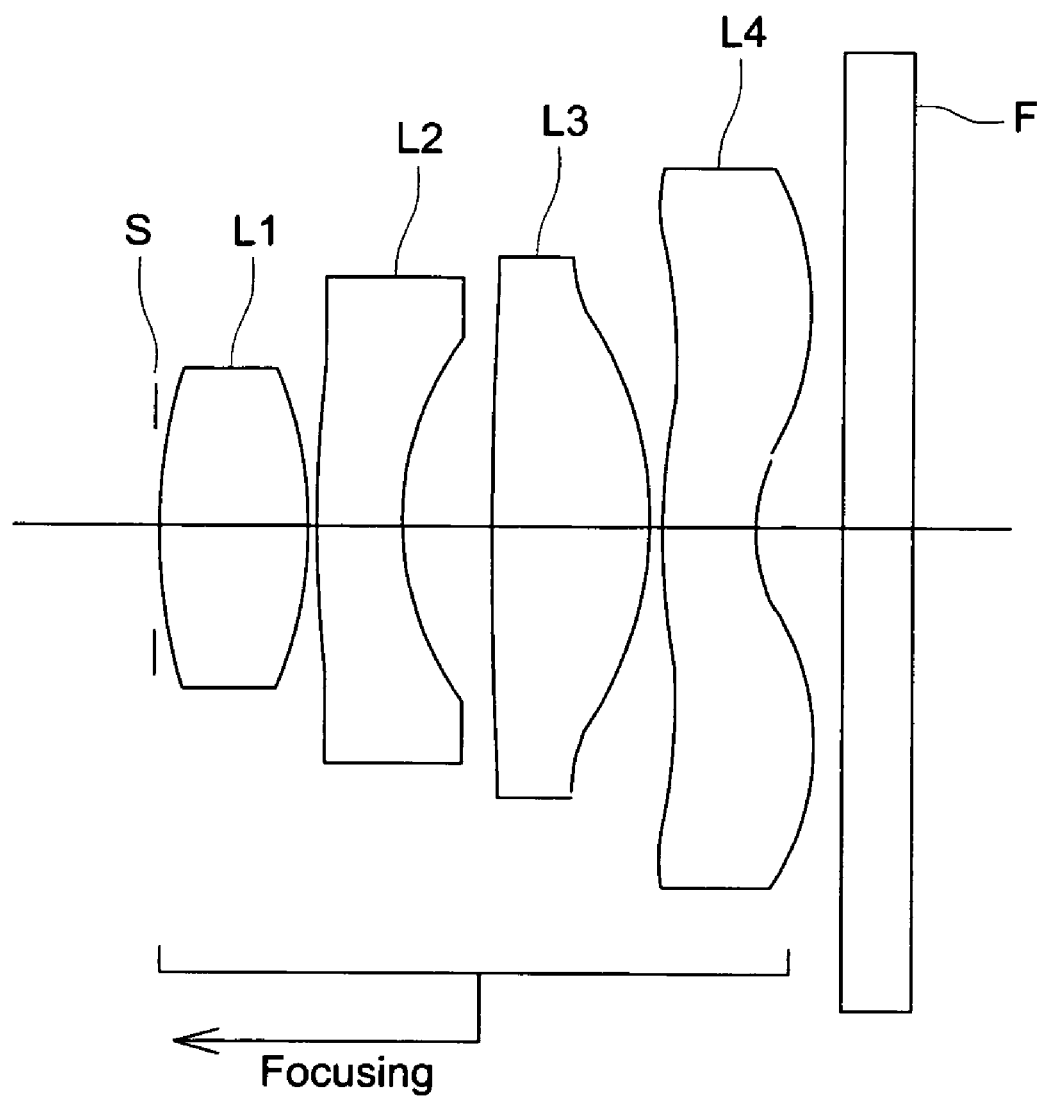
FIG. 7 is a lens sectional view in the image taking lens of example 1.
Figure 8:
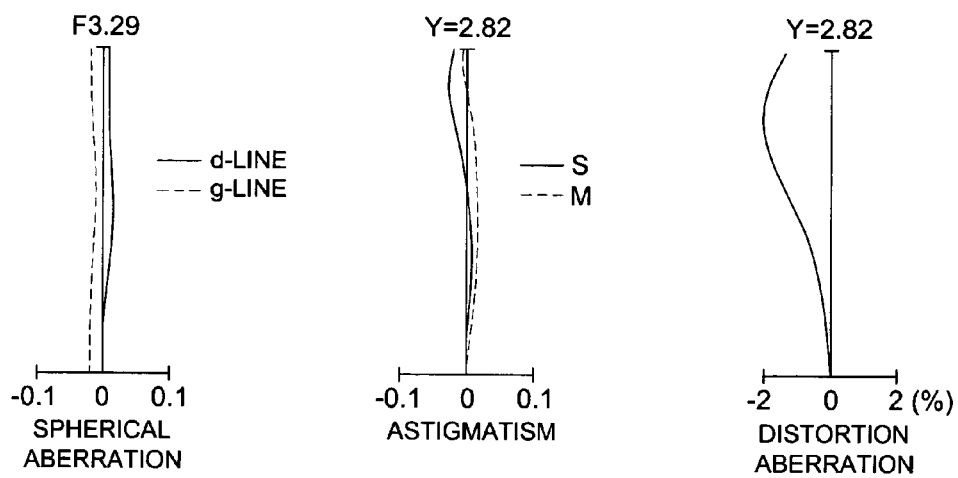
FIG. 8 is aberration views (spherical aberration, astigmatism, distortion aberration) of the image taking lens of Example 1.
Figure 8:
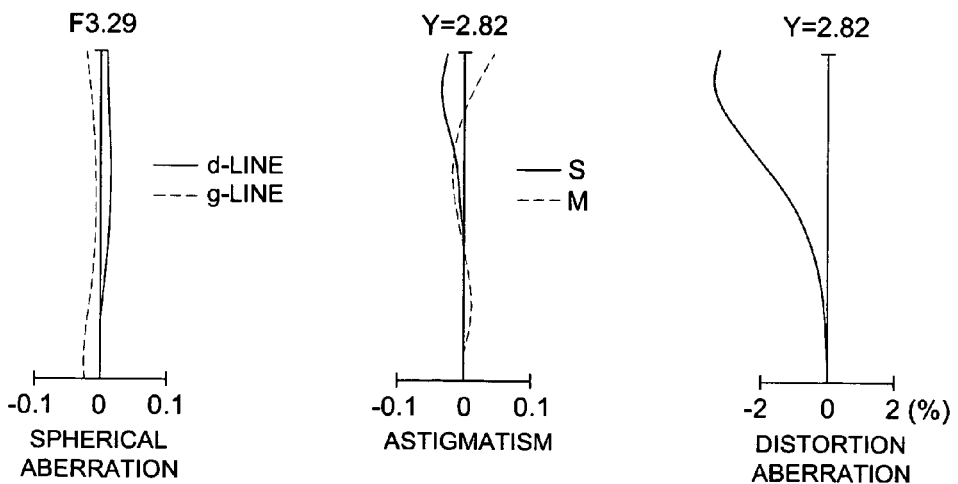

FIG. 7 is a sectional view of the lens in the image taking lens of Example 1. In the view, L1 shows the first lens, L2 shows the second lens, L3 shows the third lens, L4 shows the fourth lens, S shows the aperture stop. Further, F is the optical low pass filter, or IR cut filter, the parallel planes in which the seal glass of the solid-state image sensor is assumed. FIG. 8 is aberration views (spherical aberration, astigmatism, distortion aberration) of the image taking lens of Example 1. FIG. 8(a) is an aberration view when focusing is conducted on the subject whose distance between object and image is infinite, FIG. 8(b) is an aberration view when the stop S and lenses L1-L4 are integrally fed, and focusing is conducted on the subject whose distance between object and image is 10 cm. Hereupon, in the following aberration views, in the spherical aberration view, solid line expresses d-line, dotted line expresses g-line, in the astigmatism view, solid line expresses sagittal image surface, dotted line expresses the meridional image surface. The value (ν1-ν2) of conditional expression (3) in the present example, is 26.0.

(Example 2 of the Image Taking Lens)

Lens data of Example 2 preferable for the second embodiment are shown in Table 3, Table 4.

TABLE 3 f = 4.71 mm, fB = 0.79 mm, F = 3.29, 2Y = 5.63 mm

| Surface number | R(mm) | D(mm) | Nd | νd |
|---|---|---|---|---|
| Aperture stop | ∞ | 0.00 | | |
| 1 | 2.745 | 0.93 | 1.53180 | 56.0 |
| 2 | -5.491 | A(variable interval) | | |
| 3 | 8.037 | 0.56 | 1.58300 | 30.0 |
| 4 | 2.069 | 0.70 | | |
| 5 | -7.838 | 1.13 | 1.53180 | 56.0 |
| 6 | -1.489 | 0.10 | | |

TABLE 3-continued f = 4.71 mm, fB = 0.79 mm, F = 3.29, 2Y = 5.63 mm

| 7 | 3.515 | 0.72 | 1.53180 | 56.0 |
|---|---|---|---|---|
| 8 | 1.178 | 0.60 | | |
| 9 | ∞ | 0.50 | 1.51633 | 64.1 |
| 10 | ∞ | | | |

(Variable interval A)

| Object distance ∞: | A = 0.10 mm |
|---|---|
| Object distance 100 mm: | A = 0.23 mm |

TABLE 4

Aspheric surface coefficient

The 1$^{st}$ surface

K = −4.86610E−01
A4 = −1.07990E−02
A6 = 1.10890E−03
A8 = −5.44640E−03
A10 = −7.40110E−03

The 2$^{nd}$ surface

K = 6.15510E+00
A4 = −1.56120E−02
A6 = −3.63320E−03
A8 = 8.69330E−03
A10 = −1.45820E−02

The 3$^{rd}$ surface

K = −485150E+01
A4 = −3.98749E−02
A6 = 6.31760E−03
A8 = 1.37260E−02
A10 = −1.05990E−02

The 4$^{th}$ surface

K = −1.62120E+00
A4 = −2.15160E−02
A6 = 6.58330E−03
A8 = −5.41780E−04
A10 = 3.15460E−03
A12 = −1.33630E−03

The 5$^{th}$ surface

K = 8.07290E+00
A4 = 5.25130E−02
A6 = −2.97710E−02
A8 = 9.45390E−03
A10 = −1.93070E−03
A12 = −2.15240E−05

The 6$^{th}$ surface

K = 4.89050E+00
A4 = −2.34300E−02
A6 = 1.34310E−02
A8 = −3.97790E−03
A10 = 1.37530E−03
A12 = −1.99690E−04

The 7$^{th}$ surface

K = −1.56570E+00
A4 = −9.33540E−02
A6 = 2.03500E−02
A8 = −8.90540E−04
A10 = −1.55160E−04
A12 = 1.25210E−05

The 8$^{th}$ surface

K = −4.88720E+00
A4 = −5.59100E−02
A6 = 1.30970E−02

TABLE 4-continued

Aspheric surface coefficient

A8 = −2.32760E−03
A10 = 2.62950E−04
A12 = −1.30070E−05

The variable interval A in the table is a variable interval for focusing the object from an infinite far point to the nearest distance, while fB is made a constat value. When a value of this A is changed (that is, the aperture stop S and the first lens L1—the forth lens L4 are integrally fed to the object side), the arbitrary subject can be focused from infinite point to the nearest distance.

Figure 9:
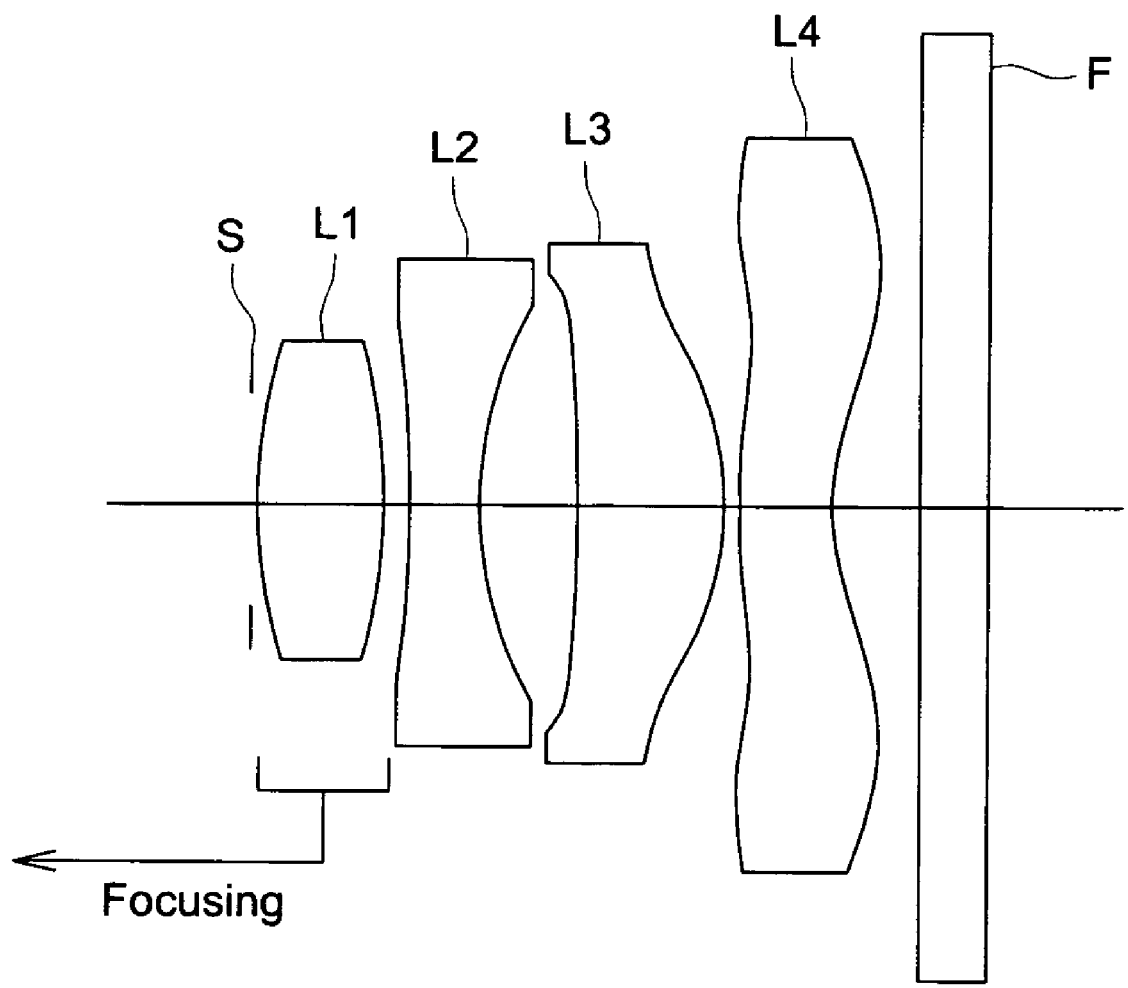
FIG. 9 is a lens sectional view in the image taking lens of Example 2.
Figure 10:
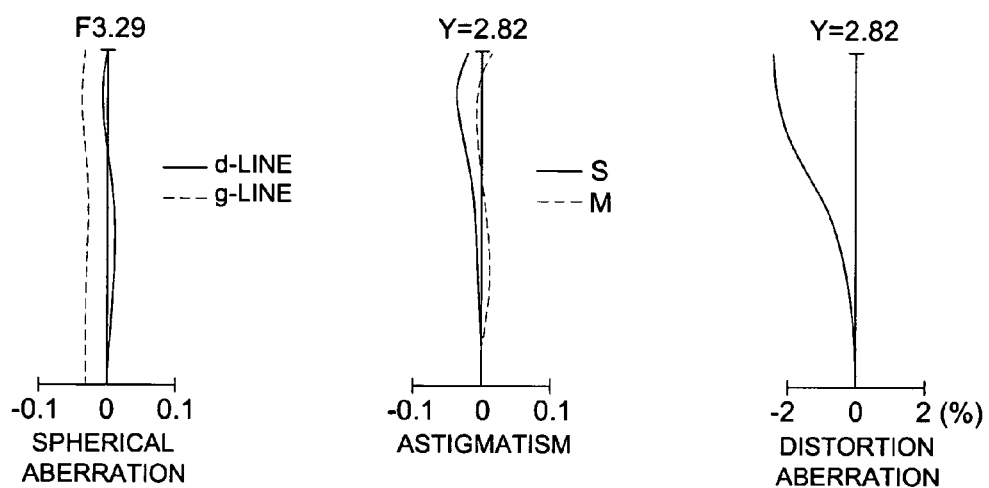
FIG. 10 is aberration views (spherical aberration, astigmatism, distortion aberration) of the image taking lens of Example 2.
Figure 10:
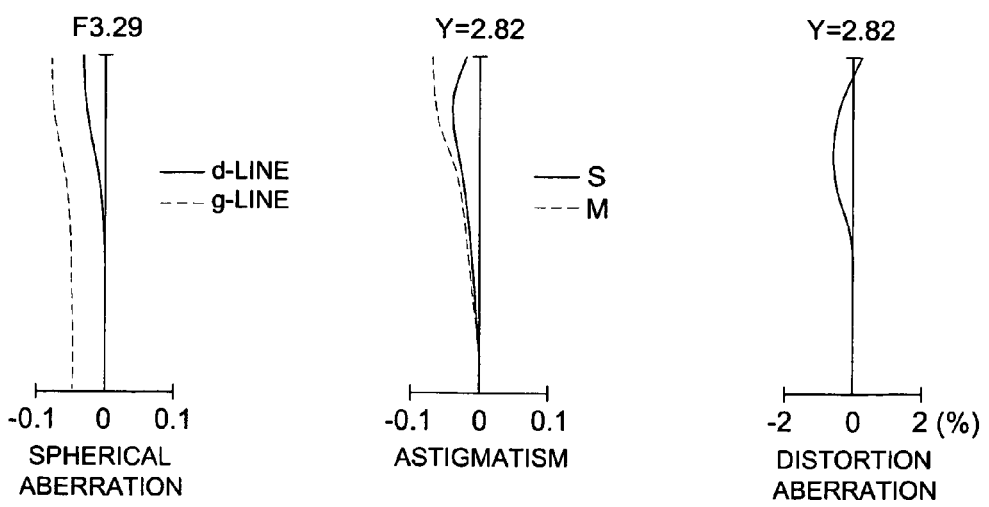

FIG. 9 is a sectional view of the lens in the image taking lens of Example 2. In the view, L1 shows the first lens, L2 shows the second lens, L3 shows the third lens, L4 shows the fourth lens, S shows the aperture stop. Further, F is the optical low pass filter, or IR cut filter, the parallel planes in which the seal glass of the solid-state image sensor is assumed. FIG. 10 is aberration views (spherical aberration, astigmatism, distortion aberration) of the image taking lens of Example 2. FIG. 10(a) is an aberration view when focusing is conducted on the subject whose distance between object and image is infinite, FIG. 10(b) is an aberration view when the stop S and lens L1 are integrally fed, and focusing is conducted on the subject whose distance between object and image is 10 cm. The value (v1-v2) of conditional expression (3) in the present example, is 26.0.

Hereupon, in the first embodiment and the second embodiment, as the solid-state image sensor, 1/3.2 type 3 mega pixel CMOS sensor (pixel pitch: 2.2 μm, effective pixel number: 2048×1536 pixels) is assumed, and it is structured such that the sizes corresponding to X and Y of the conditional expressions (1), (2) are both 9.5 mm, the height in the optical axis direction is 7.6 mm. Accordingly, the values of the conditional expressions (1), (2) are Y/DL=Y/DL=9.5 mm/5.632 mm=1.69.

Herein, in the image taking lens of the above examples 1, 2, the aperture stop is arranged on most object side. As the result, comparing to the structure in which the aperture stop is arranged between L1 and L2, because the exit pupil position can be kept far away from the solid-state image sensor to the object side, the main light ray incident angle (an angle formed between the main light ray and the optical axis, and is 0° when the main light ray is parallel to the optical axis) can be suppressed small. In the image taking lens using the solid-state image sensor, it is important that the exit pupil position of the image taking lens is kept far away from the solid-state image sensor to the object side enough. However, in the recent technology, by a review of the alignment of the color filter or on-chip micro lens array of the solid-state image sensor, the shading can be lightened. Specifically, when, to the pixel pitch of the image taking surface of the image sensor, the pitch of the alignment of the color filter or on-chip micro lens array is set slightly small, because the color filter or on-chip micro lens array is shifted to the optical axis side of the image taking lens to each of pixels as going to the peripheral part of the image taking surface, the light flux of oblique incidence can be effectively introduced to the light receiving part of each pixel. Hereby, the shading generated in the solid-state image sensor can be suppressed small.

Further, all lenses composing the image taking lens of the above examples 1, 2 are formed of plastic material. Herein, because the plastic material the refractive index change at the time of temperature change is larger than glass material, when all lenses are composed of plastic lenses, when the ambient temperature is changed, a problem that the image point position of the image taking lens all system is varied, is generated. However, because the image taking apparatus of the present invention has the AF mechanism, there is no problem at the time of normal use, but because it is necessary that an amount of variation of the image point position is prospected in the focusing lens moving amount, that results in a slight increase of the module height.

In order to suppress this image point position variation small, one part or whole of lenses may be formed of lenses formed of glass material (for example, glass mold lens). When the glass mold lens is used, in order to prevent the consumption of the molding die as much be possible, it is desired that the glass material whose glass transition point (Tg) is less than 400° C. is used.

Further, recently, it is found that, when the inorganic fine particles are mixed in the plastic material, the temperature change of the refractive index of the plastic material can be suppressed small. When described in detail, when generally, the fine particles are mixed in transparent plastic material, because the scattering of the light is generated and the transmission ratio is lowered, it is difficult to use as the optical material, however, when the size of the fine particle is made smaller than the wavelength of the transmission light flux, the scattering can be made not to be practically generated. The refractive index of plastic material is lowered when the temperature rises, however, the refractive index of the inorganic particles is increased when the temperature rises. Accordingly, when by using these temperature dependency, they are acted so as to be mutually cancelled, it can be realized that the refractive index change is scarcely generated. Specifically, when the inorganic particle whose maximum length is less than 20 nano-meter is dispersed in the plastic material which is mother material, the plastic material whose temperature dependency of the refractive index is very low is realized. For example, when the fine particle of niobium oxide ($Nb_2O_5$) is dispersed in acrylic material, the refractive index change by the temperature change can be made small. Also in the present invention, when a part of or the whole of lenses of the image taking lens are formed of the plastic material in which this inorganic particle is dispersed, the image point position variation at the time of temperature change of the all image taking lens system can be suppressed small.

According to the first embodiment and the second embodiment described above, when the value X/DL and the value Y/DL is lower than the upper limit of the conditional expressions (1) and (2), the downsizing similar to the image taking apparatus of fixed focus type which does not have the focusing mechanism can be realized, thereby, the image taking apparatus having the auto-focus mechanism can be assembled in the compact apparatus like a cellular phone. Further, when the value X/DL and the value Y/DL is higher than the lower limit of the conditional expressions (1) and (2), the wire bonding of the surrounding area or the space securing for adhering the casing and the substrate, when the solid-state image sensor is installed, becomes easy. In the present invention, although it is the image taking apparatus having the focusing mechanism, in order to realize the small size satisfying the conditional expressions (1), (2), the actuator for driving the focusing lens group is arranged in the surrounding area of the lens whose outer diameter is smallest.

When focusing lens group is a lens of a part of the image taking lens, comparing to a case where the whole of the image taking lens is moved, the weight of the focusing lens group can be lightened, and the consumption power necessary for driving can be suppressed small. Further, when the focusing lens group is the whole of the image taking lens, different from the structure in which a part of lenses is moved, the performance deterioration to an inclination error of the focusing lens group at the time of focusing or the shift error in the orthogonal direction to the optical axis is small, and the structure for guiding the direct advance of the focusing lens group can be simplified.

Figure 5A:
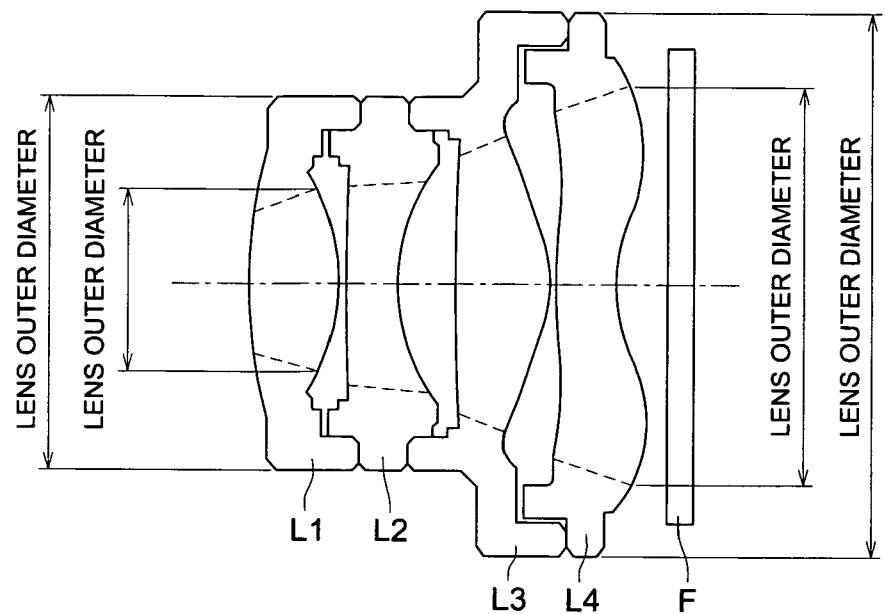
FIG. 5(A) is a view for explaining the effective diameter of an image taking lens.

Herein, the minimum effective diameter lens is the large diameter of the effective diameter of the object side surface of each lens and the image side surface (the distance from the optical axis to the maximum peripheral light of the light flux transmitting the surface and which contributes to the image formation ray called a lens is called effective radius, and two time of that is called effective diameter), and when the effective diameter of respective lenses is compared, it is called the lens having the smallest effective diameter. For example, in the example of the image taking lens shown in FIG. 5(A), the first lens L1 is the minimum effective diameter lens and the fourth lens L4 is the maximum effective diameter lens. Further, the lens outer diameter is an outer diameter including the flange part of the periphery of the effective diameter.

Figure 5B:
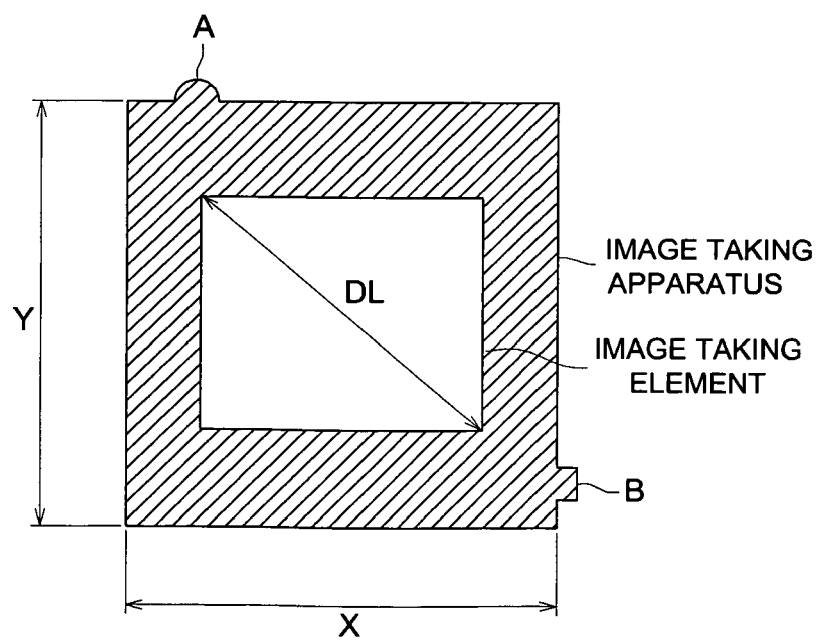
FIG. 5(B) is a view for explaining values of a conditional expressions (1), (2).

As shown in FIG. 5(B), when the Image taking apparatus is projected to the substrate in which the image sensor is equipped, the dimension of the image taking apparatus in the long side direction of the image sensor rectangular effective pixel area is X, and the dimension of the image taking apparatus in the short side direction of the image sensor rectangular effective pixel area is Y, and the conditional expressions (1), (2) are regulated. Herein, for X, Y, they are maximum values of image taking apparatus in respective directions, however, a flexible substrate connected to the image taking apparatus, a minute convex part (A) used in the assembling process, formed on the outer wall of the image taking apparatus, additional part (B) fixed on the outer wall, are not included in the image taking apparatus for regulating the dimension. When the effective pixel area of the solid-state image sensor is not rectangular, X, Y is determined by approximating the rectangular.

Further, "space generated on the periphery of the minimum effective diameter lens by the difference between the outer diameter of the minimum effective diameter lens and the outer diameter of the maximum effective diameter lens" includes "space generated on the periphery of the minimum effective diameter lens as the result by the difference between the outer diameter of the minimum effective diameter lens and the outer diameter of the maximum effective diameter lens" and when, for example, both of the minimum effective diameter lens and the maximum effective diameter lens are held by the holding member, the space generated on the periphery of the minimum effective diameter lens by the difference of the outer diameter of the holding member is corresponding to "the space generated on the periphery of the minimum effective diameter lens by the difference between the outer diameter of the minimum effective diameter lens and the outer diameter of the maximum effective diameter lens".

Further, when the first lens on the most object side has the positive refractive power, the total length of the image taking lens can be suppressed small, as the result, the height (the thickness of the optical axis direction of the image taking lens) of the whole image taking apparatus can be made small. Further, when the aperture stop is arranged on the object side or image side of the first lens, it is apt to a structure that the effective diameter of each lens constituting the image taking lens becomes large as it goes from the first lens on the most object side to the lens on the most image side. Accordingly, the securement of the space for arranging the actuator becomes easier.

Further, in the first embodiment and the second embodiment, when in order from the object side, the first lens having positive refractive power which is the minimum effective diameter lens, the second lens having negative refractive power, the third lens having positive refractive power are arranged, while the aberration correction is conducted with well balance, as it goes from the object side to the image side, the structure in which the effective diameter of each lens gradually becomes large, is apt to be adopted. Accordingly, it becomes the image taking lens in which at least one part of the actuator for driving the focusing lens group is apt to be arranged on the periphery of the first lens.

Further, this structure that has so-called triplet type lens arrangement, is the structure in which aberrations such as the spherical aberration, coma, image surface curvature are well corrected. Further, when Abbe's number of the first lens, the second lens satisfying the following conditional expression (3), are set, the structure can finely correct the color aberration, and is more preferable. More specifically, when the lower limit of the conditional expression (3) is exceeded, the color aberration on axis, magnification color aberration, can be corrected with well balance. Further, when the upper limit of the conditional expression (3) is under-run, the lens can be structured by the optical material that can be easily obtained.

$$25 < v1 - v2 < 65 \quad (3)$$

Where, v1: Abbe's number of the first lens, v2: Abbe's number of the second lens Further, when the height in the lens optical axis direction in the image taking apparatus is less than 10 (mm), the smaller sized image taking apparatus can be obtained. Herein, "the height in the lens optical axis direction in the image taking apparatus is less than 10 (mm)" means the total length along the optical axis direction of the image taking apparatus provided with the above whole structure. Accordingly, for example, when the casing is provided on the front surface of the substrate, and the electronic parts are equipped on the rear surface of the substrate, it is assumed that the distance from the front edge part which is the object side of the casing to the front edge part of electronic part protruded on the substrate rear surface is less than 10 (mm).

Figure 11:
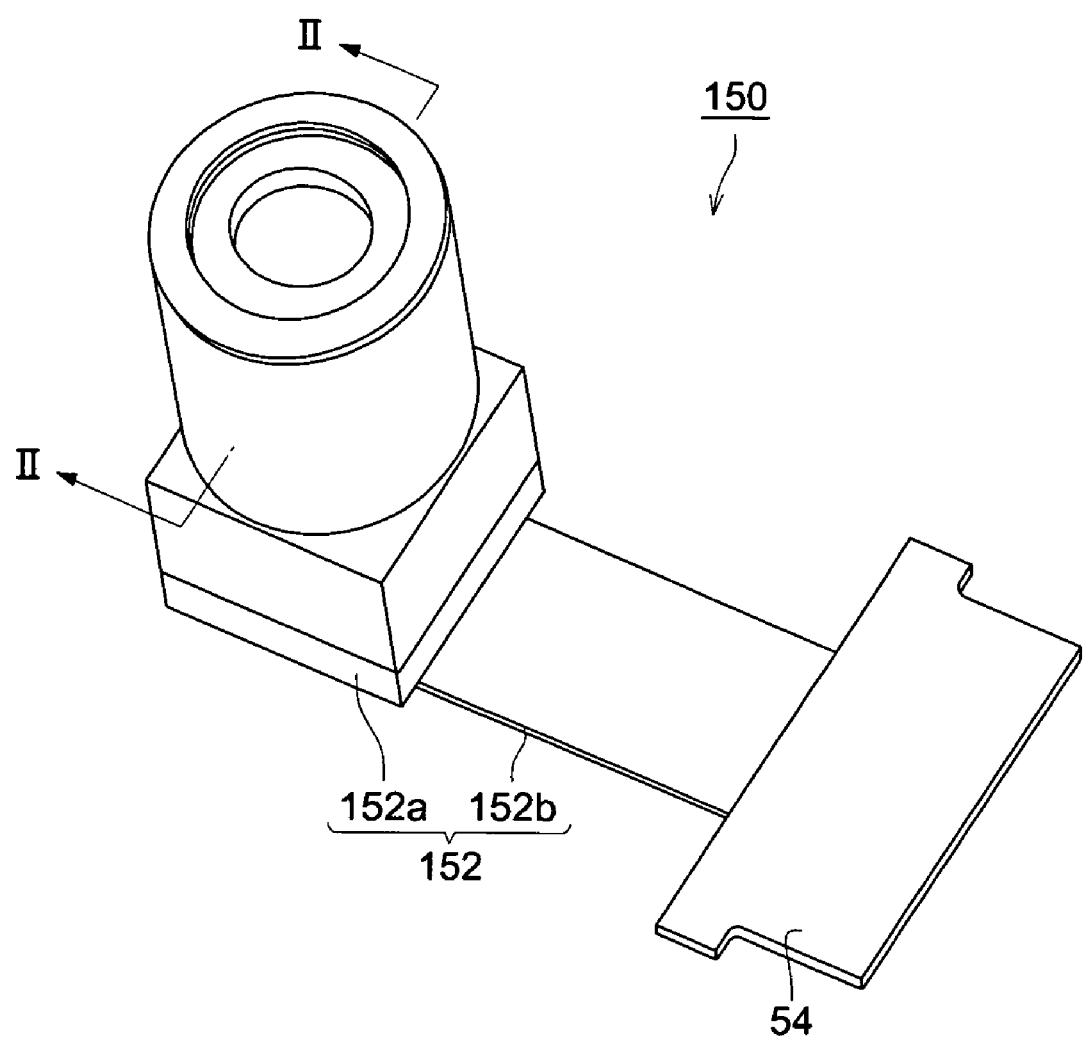
FIG. 11 is a perspective view of the image taking apparatus 150 according to the present embodiment.
Figure 12:
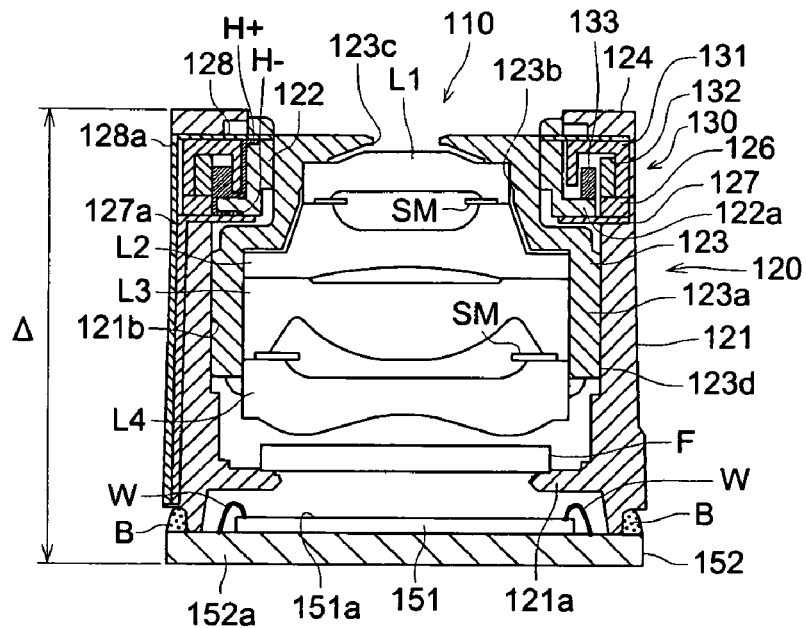
FIG. 12 is a sectional view in which the image taking apparatus 150 of FIG. 11 in the inactivation status is cut along the surface including II-II line.
Figure 13:
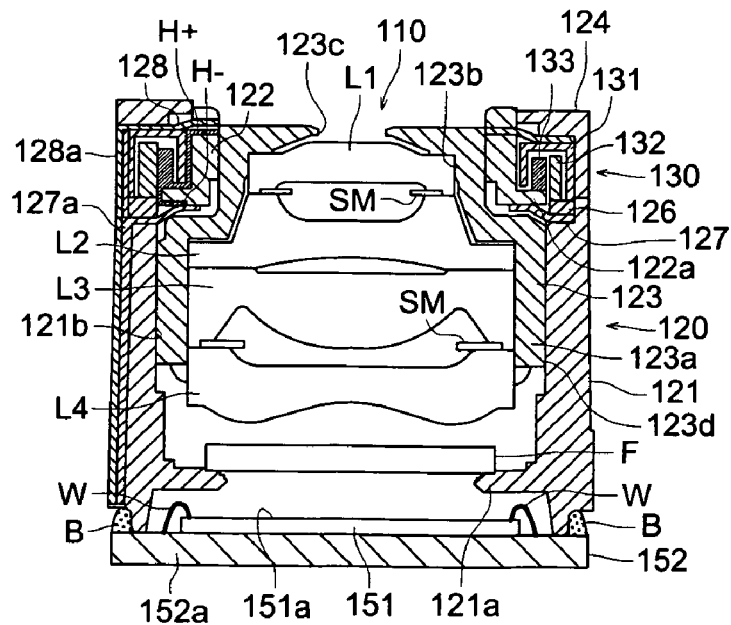
FIG. 13 is a sectional view in which the image taking apparatus 150 of FIG. 11 in the activation status is cut along the surface including II-II line.

Next, based on FIG. 11, FIG. 12, FIG. 13, the third embodiment of the present invention will be described. FIG. 11 is a perspective view of the image taking apparatus 150 according to the third embodiment, FIG. 12, FIG. 13 are sectional views cut along the surface including II-II line of the image taking apparatus 150 of FIG. 11, and FIG. 12 shows the situation when the coil of the actuator is not turned on electricity, and FIG. 13 shows the situation when the coil of the actuator is turned on electricity.

The above image taking apparatus 150 is provided with: CMOS type image sensor 151 as the solid-state image sensor having the photoelectric conversion section 151a; the image taking lens 110 as the taking lens for image-taking the object image on the photoelectric conversion section 151a of this image sensor 151; IR cut filter F arranged between the image sensor 151 and the image taking lens 110; the substrate 152 for holding the image sensor 151, and having the terminal for external connection 54 (FIG. 11) for sending and receiving the electric signal; the assembling casing 120 for supporting the image taking lens; and the actuator 130 for driving the focusing lens, and they are integrally formed. Hereupon, the height Δ in the optical axis direction of the present image taking apparatus is less than 10 mm.

In the above image sensor 151, the photoelectric conversion section 151a as the light receiving section in which the pixels (photoelectric conversion element) are 2-dimensionaly arranged, is formed in the central part of the plane of its light receiving side, and in its surrounding area, the signal processing circuit (not shown) is formed. Such a signal processing circuit comprises the drive circuit section for successively driving each pixel, and for obtaining the signal charge, A/D conversion section for converting each signal charge into the digital signal, and the signal processing section for forming the image signal output by using this digital signal. Further, in the vicinity of outer edge of the plane on the light receiving side of the image sensor 51, numbers of pads (the figure is omitted) are arranged, and connected to the substrate 151 through wire W. The image sensor 151 converts the signal charge from the photoelectric conversion section 151a into the image signal such as the digital YUV signal, and outputs to a predetermined circuit on the substrate 152 through the wire W. Herein, Y is the brightness signal, U (=R−Y) is the color difference signal of red and the brightness signal, V (=B−Y) is the color difference signal of blue and the brightness signal. Hereupon, the image sensor is not limited to the above CMOS type image sensor, but the other sensor such as CCD may also be used.

The substrate 152 is provided with a support flat plate 152a supporting the above image sensor 151 and the outer cylinder 121 on its one plane, and the flexible substrate 152b (FIG. 11) whose one end part is connected to the support flat plate 152a.

The support flat plate 152a has many number of pads for signal transmission provided on the surface, and this is connected to the wire W from the image sensor 151, and connected to the flexible substrate 152b.

The flexible substrate 151b is as described above, its one end part is connected to the support flat plate 152a, and through the terminal 54 for external connection provided on it's other end part, the support flat plate 152a and the external circuit (for example, the control circuit owned by the higher rank apparatus in which the image taking apparatus is equipped) are connected, and from the external circuit, the voltage for driving the image sensor 151, or the clock signal is supplied, or the digital YUV signal can be outputted to the external circuit. Further, the intermediate part of the longitudinal direction of the flexible substrate 151b has the flexibility or deformation easiness, and by the deformation, for the support flat plate 152a, the degree of freedom is given to the aspect or arrangement of the external output terminal.

The assembling casing 120 formed of the light shielding member, comprises the outer cylinder (called also fixed member) 121 which is arranged in such a manner to surround the image sensor 51, and whose lower end is adhered by using the adhesive agent B to the support flat plate 152a, the moving cylinder 123 arranged inside the outer cylinder 121 and which is movable, and the cover member 124 arranged above the outer cylinder 121. To the flange part 121a extendedly existing from the inner periphery of the outer cylinder 121 to the inside of the radial direction, the IR cut filter F is affixed.

The moving cylinder 123 has the cylinder small diameter part 123b above the cylinder large diameter part 123a, further, has the shape that the upper part of the cylinder small diameter part 123b is shielded except the central aperture (aperture stop). In the inside of the moving cylinder 123, from the object side, the first lens L1, the second lens L2, the third lens L3, the fourth lens L4 are, in this order, fixedly involved and held. More specifically, in the inside of the cylinder small diameter part 123b, a part of the first lens L1 and the second lens L2 is arranged, in the inside of the cylinder large diameter part 123a, the remained lens group are arranged. On the outer periphery of the cylinder small diameter part 123b, the driving cylinder 122 driven by the actuator 130 is fixed. The outer peripheral surface 123d of the cylinder large diameter part 123a which is positioned on the image sensor 51 side from the actuator 130, and positioned at least on the periphery of the fourth lens L4, is a guide cylinder part (called also the guide section or cylinder surface), and engaged with the inner peripheral surface (called also the guide cylinder surface) 121b movably in the optical axis direction.

The lower surface of the flange part 122a of the moving cylinder 122 is brought into contact with the upper surface of the spring disc 127 whose outer peripheral side is fixed by the screw member 126 screwed in the upper end of the outer cylinder 121. The upper part of the driving cylinder 122 is brought into contact with the lower surface of the spring member 128 whose outer peripheral side is sandwiched between the cover member 124 fitted to the upper end of the outer cylinder 121 and the yoke 131 of the actuator 130. The spring members 127 and 128 in the free condition have the shape almost shown in FIG. 12, that is, in the deformation condition shown in FIG. 13, by its spring force, the driving cylinder 122 is energized to the lower direction.

The actuator 130 which is a ring like voice coil motor, has a yoke 131 arranged in the space between the driving cylinder 122 in the outside of the radial direction of the first lens L1 and the cover member 124, the magnet 132 fixed in the yoke 131, and the coil 133 whose lower end is fitted to the flange part 122a of the driving cylinder 122. The plus terminal of the coil 133 is connected to the spring member 128 through the flexible wire H+ extendedly existing along the outer peripheral surface of the driving cylinder 122. Further, the minus terminal of the coil 133 is connected to the spring member 127 through the flexible wiring H− extendedly existing along the outer wall of the flange part 122a of the driving cylinder 122. A part of the spring members 127, 128, as the wiring part 127a, 128a (they are insulated from each other), comes to the substrate 152 along the outer wall of the outer cylinder 121. Because the drive principle of the voice coil motor is well known, description is omitted, however, by the magnetic force generated when, from the outside, through the spring members 127, 128, wiring H+, H−, the electric power is supplied to the coil 133, to the magnet 132, the coil 133 can be dislocated corresponding to the supplied electric power.

The image taking lens 10 has, in order from the object side, the aperture stop 123c, the first lens L1 having the positive refractive power, and whose convex surface faces the object side, the second lens L2 having the negative refractive power, the third lens L3 having the positive refractive power, the fourth lens L4 having the negative refractive power. The lenses L1, L2, L3, L4 constituting the focusing lens as the whole, are housed in the inside of the assembling casing under the condition that their optical axis and the central line of the outer cylinder 121 are coincided. In the third embodiment, the fourth lens L4 composes the most image side lens, and because the first lens L1 is the minimum lens whose outer diameter is minimum, for the case where the actuator 130 is arranged outside of the radial direction of the first lens L1, it is an appropriate structure.

This image taking lens 10 is, to the solid-state image sensor, for image-forming the object image, when the aperture stop 123c, and each lens L1, L2, L3, L4 are the optical system. The aperture stop 123c is a member for determining F-number of the whole system of the image taking lens.

The IR cut filter F held by the flange part 121a of the outer cylinder 121 between the image taking lens 10 and the image sensor 51 is a member, for example, formed into about rectangular or circular.

Further, the light shielding mask SM is arranged between the first lens L1 and the second lens L2. Further, the light shielding mask SM is arranged between the third lens L3 and the fourth lens L4, and it is prevented that the unnecessary light is incident on the outside of the fourth lens L4 effective diameter, and the generation of ghost or flare can be suppressed.

The use embodiment of the above image taking apparatus will be described. FIG. 14 is a view showing the condition that the image taking apparatus 150 is equipped in the cellular phone 1100 as the carrying terminal. Further, FIG. 15 is a control block diagram of the cellular phone 1100.

In the image taking apparatus 150, for example, the side-surface of the object side of the outer cylinder 121 in the image taking lens is provided on the rear surface of the cellular phone 1100 (the liquid crystal display section side is the front side), and arranged in the position corresponding to the lower side of the liquid crystal display section.

The terminal 54 for external connection of the image taking apparatus 150 is connected to the control section 1101 of the cellular phone 1100, and outputs the image signal such as the brightness signal or the color difference signal to the control section 1101 side.

Figure 15:
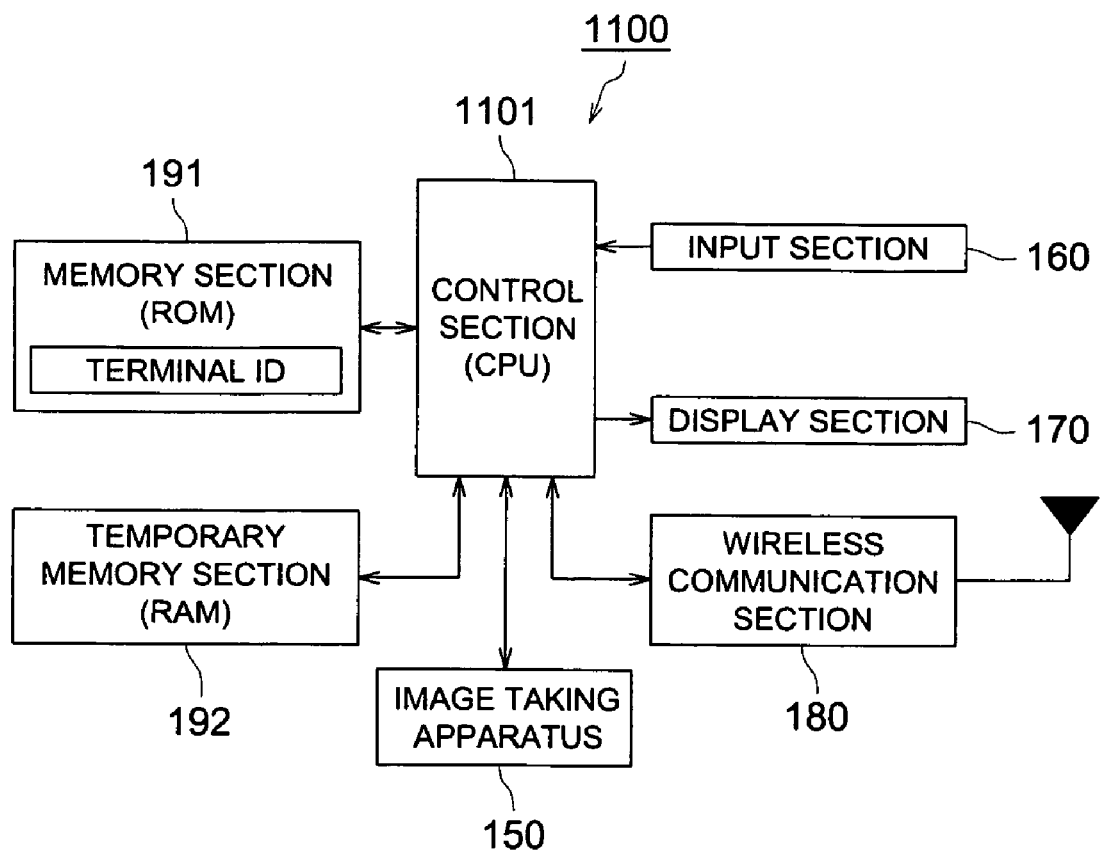
FIG. 15 is a control block diagram of the cellular phone 1100.

On the one hand, the cellular phone 1100 is provided with: as shown in FIG. 15, the control section (CPU) 1101 which controls overall each section and conducts the program corresponding to each processing; input section 160 for supporting and inputting the number by keys; display section 170 for displaying the image-taken image or video other than a predetermined data; wireless communication section 180 for realizing the each kind of information communication between the external server; memory section (ROM)191 which stores the system program of the cellular phone 1100, each kind of processing program and necessary datum such as terminal ID; and temporary memory section (RAM) 192 which is used as a working area in which each kind of processing program or datum conducted by the control section 1101, or processing data, or the image taking data by the image taking apparatus 150 is temporarily stored.

When the photographer having the cellular phone 1100 faces the optical axis of the image taking lens 10 of the image taking apparatus 150 to the object, the image signal is taken into the image sensor 51, and for example, when the image surface AF processing or the like is carried out, the focus slippage can be detected. Because the control section 1101 supplies the electric power to the actuator 130 so that the lenses L1-L4 are driven in the direction in which this focus slippage is solved, the electric power is supplied to the coil 133 from the terminal 52a for external connection through the spring members 127, 128, the wiring H+, H−. When the magnetic force generated thereby and the energizing force of the deformed spring members 27, 28 are balanced, because the moving cylinder 123 is moved in the optical axis direction together with the moving cylinder 122, and the lenses L1-L4 can be moved to the optimum focus position between the position shown in FIG. 12 and the position shown in FIG. 13, and held, the adequate auto-focus operation can be realized. At this time, because in the outer peripheral surface 123d of the cylinder large diameter part 123a, it's length in the optical axis direction can be taken comparatively long, (in the case of this example, about ⅓ of total length of the image taking apparatus), when it slidingly moves along the inner peripheral surface 121b of the outer cylinder 121, while the guide function as the guide cylinder part is exerting, the near race between both is suppressed, and the smooth focusing movement can be realized. Hereupon, when the drive force of the voice coil motor 130 is eliminated by the interruption of the electric power supply, the moving cylinder 123 returns to the position shown in FIG. 12.

Further, at the desired shutter chance, when the photographer presses the button BT shown in FIG. 14, release is carried out, and the image signal is taken into the image taking apparatus 150. The image signal inputted from the image taking apparatus 150, stored in the memory section 192 or displayed on the display section 170, by the control system of the above cellular phone 1100, further, transmitted to the outside as the image information through the wireless communication section 180.

Figure 16:
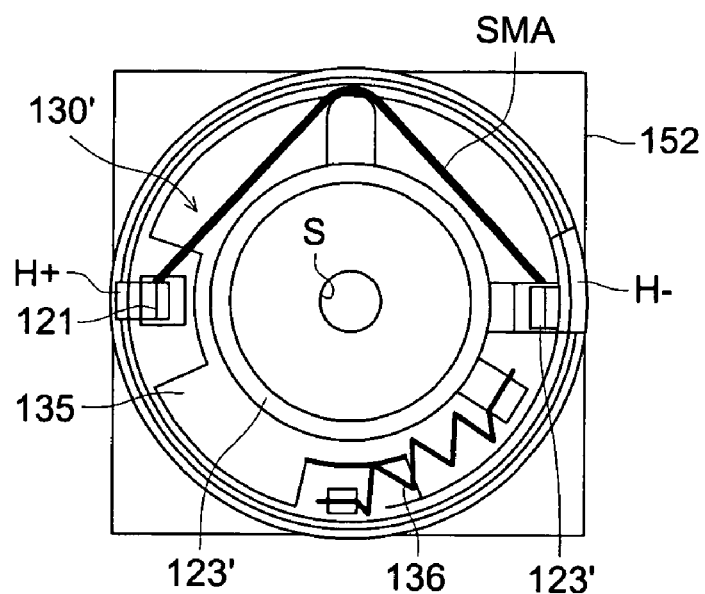
FIG. 16 is a view in which the actuator 130' according to the second embodiment which can be used for the cellular phone 1100 is viewed in the optical axis direction.
Figure 17:
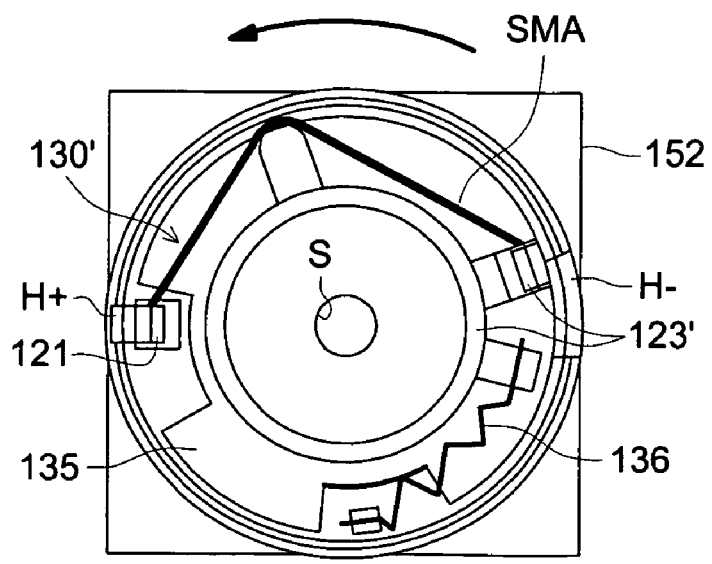
FIG. 17 is a view in which the actuator 130' according to the second embodiment which can be used for the cellular phone 1100 is viewed in the optical axis direction.

FIG. 16, and FIG. 17 are views in which the actuator 130' in the image taking apparatus according to the fourth embodiment usable for the cellular phone 1100 is viewed in the optical axis direction, FIG. 16 shows the situation when the actuator 130' is not turned on, and FIG. 17 shows the situation when the actuator 130' is turned on. Hereupon, in the fourth embodiment, because only the structure of the actuator is different to the third embodiment shown in FIG. 11, FIG. 12, FIG. 13, to common structure, the same sign is given and the description will be omitted.

In the fourth embodiment, for the actuator 130' (hereinafter, called wire SMA), the shape memory alloy is used in the form of the wire. The shape memory alloy is an alloy that is arbitrarily deformed when the electric power is supplied from the outside, and the detail is written, for example, in Japanese translation of PCT international application No. JP 2003-507625.

In FIG. 12, FIG. 13, the moving cylinder 123' energized low-ward to the cover member 124 by a spring plate 128, forms the follower 123c' (FIG. 18, FIG. 19) on the lower surface of the flange part 123b'. On the one hand, an adjusting ring 135 (FIG. 16, FIG. 17) fitted to the upper part of the outer cylinder 121 forms a cam part 135a (FIG. 18, FIG. 19) on its upper surface in which the height is continuously changed and the follower 123' is slidingly moved.

In FIG. 16, FIG. 17, the left end of wire SMA formed of the shape memory alloy, is caulked and fixed to the outer cylinder 121, and the right end of the wire SMA is fixed to the moving cylinder 123'. The left end of wire SMA is electrically connected to the wiring H+, and the right end of the wire SMA is electrically connected to the wiring H−. Further, the moving cylinder 123' is linked to the outer cylinder 121 by the tension spring 136, and in FIG. 16, FIG. 17, is energized clockwise.

Figure 18:
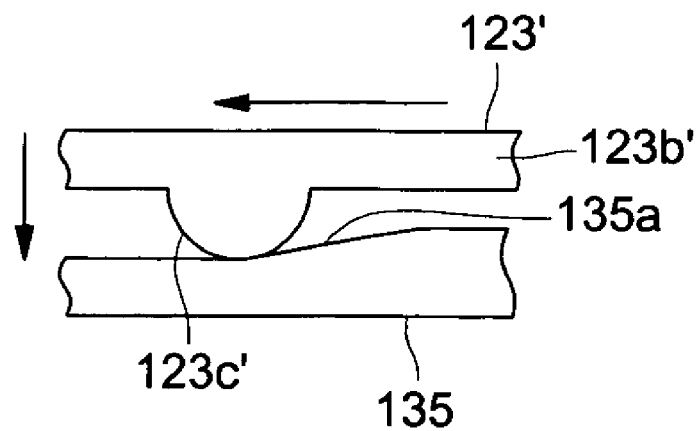
FIG. 18 is a view showing the relationship of a cam follower corresponding to FIG. 16.
Figure 19:
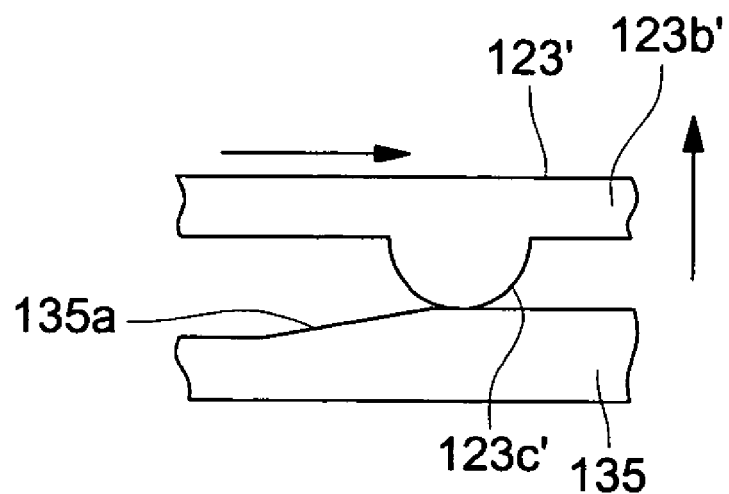
FIG. 19 is a view showing the relationship of a cam follower corresponding to FIG. 17.

When by the control of the control section 1101, the electric power is supplied to the wire SMA through the wiring H+, H−, the wire SMA shrinks from the status shown in FIG. 16 by the amount corresponding to the electric power, and against the energizing force of the tension spring 136, and changed to the status shown in FIG. 17. In this case, the wire SMA rotates the moving cylinder 123' to the outer cylinder 121, and when the follower 123c' is moved along the cam 135a as shown in FIG. 19, because while the moving cylinder 123' holds the lenses L1-L4, moves toward the optical axis direction to the outer cylinder 121, the adequate focusing movement can be carried out. Hereupon, by the interruption of the electric power supply, when the wire SMA returns to the original shape, the moving cylinder 123' returns to the status shown in FIG. 16, FIG. 18.

Figure 20:
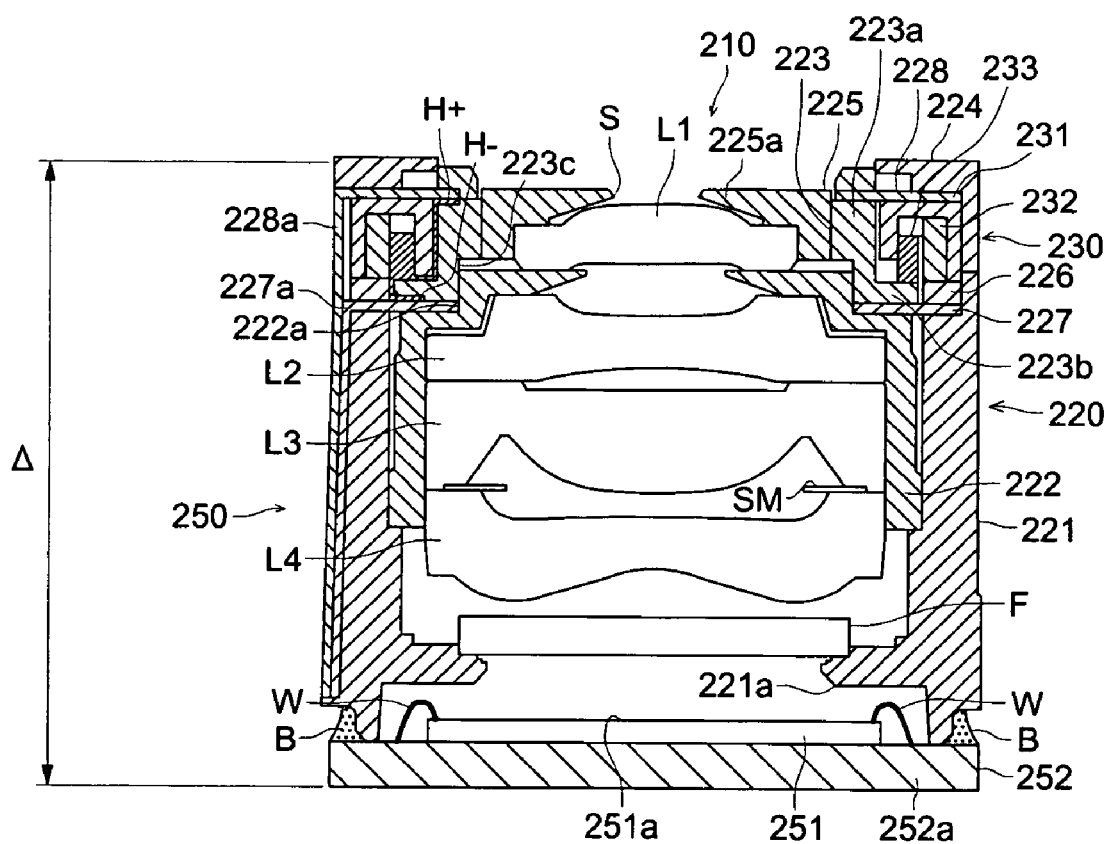
FIG. 20 is a sectional view in which the image taking apparatus 150 of FIG. 11 in the inactivation status is cut along the surface including II-II line.
Figure 21:
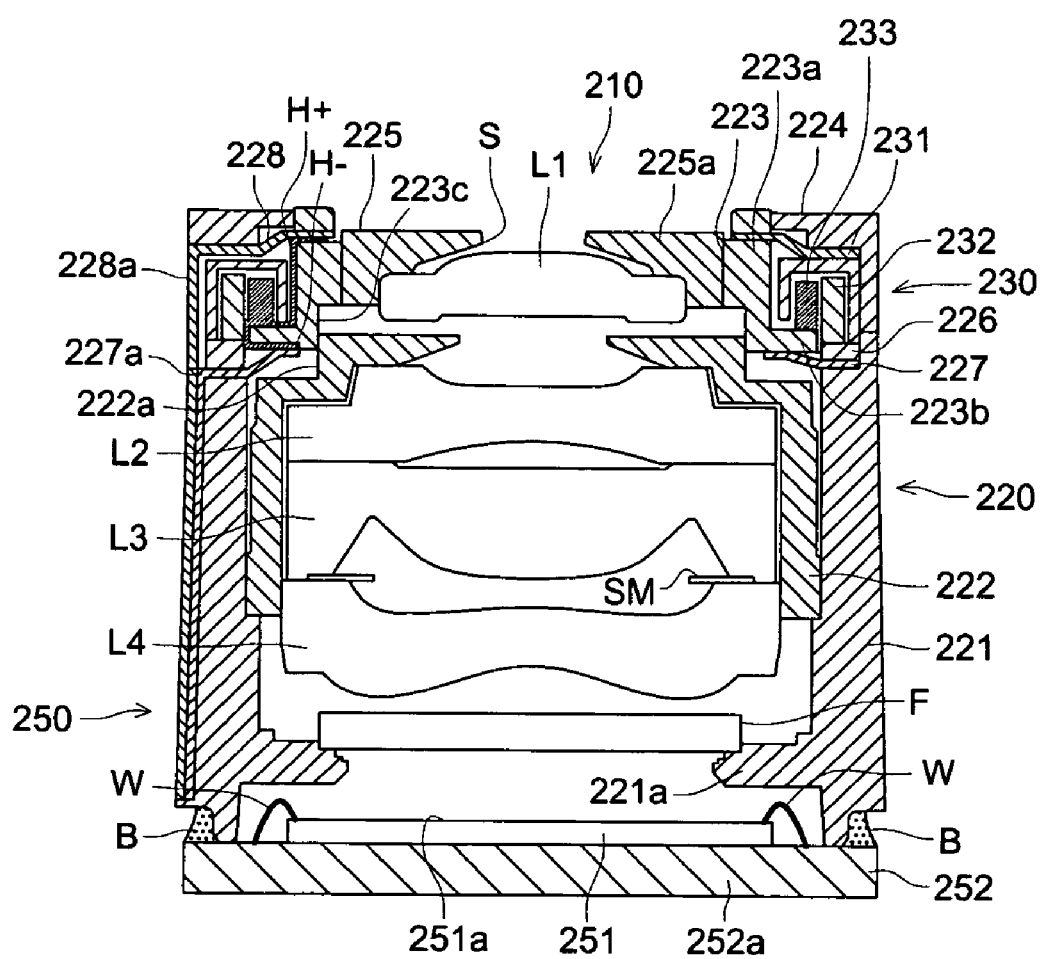
FIG. 21 is a sectional view in which the image taking apparatus 150 of FIG. 11 in the activation status is cut along the surface including II-II line.

Based on the drawings, the fifth embodiment of the present invention will be described below. Hereupon, because the external view of the image taking apparatus 250 according to the fifth embodiment is common to the third embodiment, the perspective view will be described by using FIG. 11. FIG. 20, FIG. 21 are sectional views in which the image taking apparatus 150 of FIG. 11 (in FIG. 20 and FIG. 21, corresponds to 250), is cut along the surface including II-II line, and FIG. 20 shows the status when the coil of the actuator is not turned on, and FIG. 21 shows the status when the coil of the actuator is turned on.

The image taking apparatus 250 is provided with: CMOS type image sensor 251 as the solid-state image sensor having the photoelectric conversion section 251a; the image taking lens 210 as the image taking lens which image-takes the subject image in the photoelectric conversion section 251a of this image sensor 251; the IR cut filter F arranged between the image sensor 251 and the image taking lens 210; the substrate 252 having the terminal 54 for external connection (refer to FIG. 11) which holds the image sensor 251 and sends and receives its electric signal; the assembling casing 20 for supporting the image taking lens; and the actuator 230 for driving the focusing lens, and they are integrally formed. Hereupon, the optical direction height A of the present image taking apparatus 250 is less than 10 mm.

In the above image sensor 251, the photoelectric conversion section 251a as the light receiving section in which the pixels (photoelectric conversion element) are 2-dimensionaly arranged, is formed in the central part of the plane of its light receiving side, and in its surrounding area, the signal processing circuit (not shown) is formed. Such a signal processing circuit comprises the drive circuit section for successively driving each pixel, and for obtaining the signal charge, A/D conversion section for converting each signal charge into the digital signal, and the signal processing section for forming the image signal output by using this digital signal. Further, in the vicinity of outer edge of the plane on the light receiving side of the image sensor 51, numbers of pads (the figure is omitted) are arranged, and connected to the substrate 251 through wire W. The image sensor 251 converts the signal charge from the photoelectric conversion section 251a into the image signal such as the digital YUV signal, and outputs to a predetermined circuit on the substrate 152 through the wire W. Herein, Y is the brightness signal, U (=R−Y) is the color difference signal of red and the brightness signal, V (=B−Y) is the color difference signal of blue and the brightness signal. Hereupon, the image sensor is not limited to the above CMOS type image sensor, but the other sensor such as CCD may also be used.

The substrate 252 is provided with a support flat plate 252a supporting the above image sensor 251 and the outer cylinder 221 on its one plane, and the flexible substrate 252b (corresponds to 151b in FIG. 11) whose one end part is connected to the support flat plate 252a.

The support flat plate 252a has many number of pads for signal transmission provided on the surface, and this is connected to the wire W from the image sensor 251, and connected to the flexible substrate 252b.

The flexible substrate 251b is, as described above, its one end part is connected to the support flat plate 252a, and through the terminal 54 for external connection provided on it's other end part, the support flat plate 252a and the external circuit (for example, the control circuit owned by the higher rank apparatus in which the image taking apparatus is equipped) are connected, and from the external circuit, the voltage for driving the image sensor 251, or the clock signal is supplied, or the digital YUV signal can be outputted to the external circuit. Further, the intermediate part of the longitudinal direction of the flexible substrate 251b has the flexibility or deformation easiness, and by the deformation, for the support flat plate 152a, the degree of freedom is given to the aspect or arrangement of the external output terminal.

The assembling casing 20 formed of the light shielding member, is comprises the outer cylinder 221 which is arranged in such a manner to surround the image sensor 251, and whose lower end is adhered by using the adhesive agent B to the support flat plate 152a, the inner cylinder 222 arranged inside the outer cylinder 221, and the moving cylinder 223 which is arranged above the inner cylinder 222 and movable, and the cover member 224 arranged outside the moving cylinder 223 and having the aperture for light incidence in the center.

To the flange part 221a extendedly existing from the inner periphery of the outer cylinder 221 to the inside of the radial direction, the IR cut filter F is affixed. The inner cylinder (called also fixed holding section) 222 has lenses, from the object side, in order of the second lens L2, the third lens L3, the fourth lens L4, and they are fixedly, included and held, and further, has the guide cylinder part 222a protruded above.

The moving cylinder (also called moving and holding part) 223 has the cylindrical main body 223a and the flange part 223b formed on the lower end which is its image side end, and on the lower end inner periphery of the main body 223a, the cylindrical surface 223c whose diameter is enlarged so that it can engage with the guide cylinder part 222a formed above (object side) the inner cylinder 222 is formed. The main body 223a of the moving cylinder 223 involves and holds the holder 225 holding the first lens L1. The holder 225 has the flange part 225a arranged on the object side of the first lens L1, and its central aperture is the aperture stop S.

The lower surface of the flange part 223b of the moving cylinder 223 is in contact with the upper surface of the spring disc 227 whose outer peripheral side is fixed by the screw member 226 screwed in the upper end of the outer cylinder 221. The upper part of the main body 223a of the moving cylinder 223 is in contact with the lower surface of the spring member 228 whose outer surface side is sandwiched between the cover member 224 fitted on the upper end of the outer cylinder 221 and the yoke 231 of the actuator 230. The spring members 227, 228 in the free status, are about the shape shown in FIG. 20, that is, in the deformed status shown in FIG. 21, the moving cylinder 223 is forced low-ward by the spring force.

The actuator 230 which is a ring like voice coil motor, has a yoke 231 arranged in such a manner to be sandwiched between the outer cylinder 221 and the cover member 224, in the space which is the outside of the radial direction of the first lens L1 and above the outer cylinder 221 and in its outer diameter, the magnet 232 fixed in the yoke 231, and the coil 233 whose lower end is fitted to the flange part 223b of the driving cylinder 223. The plus terminal of the coil 233 is connected to the spring member 228 through the wiring H+ extendedly existing on the outer wall of the main body 223a of the moving cylinder 223. Further, the minus terminal of the coil 233 is connected to the spring member 227 through the wiring H− extendedly existing along the outer wall of the flange part 223b of the moving cylinder 223. A part of the spring members 227, 228, as the wiring part 227a, 228a (they are insulated from each other), comes to the substrate 252 along the outer wall of the outer cylinder 221. Because the drive principle of the voice coil motor is well known, description is omitted, however, by the magnetic force generated when, from the outside, through the spring members 227, 228, wiring H+, H−, the electric power is supplied to the coil 233, to the magnet 232, the coil 233 can be dislocated correspondingly to the supplied electric power.

The image taking lens 210 has, in order from the object side, the aperture stop S, the first lens L1 having the positive refractive power, and whose convex surface faces the object side, the second lens L2 having the negative refractive power, the third lens L3 having the positive refractive power, the fourth lens L4 having the negative refractive power. The lenses L1, L2, L3, L4 are housed in the inside of the assembling casing 20 under the condition that its optical axis and the central line of the outer cylinder 221 are coincided. In the fifth embodiment, the fourth lens L4 composes the most image side lens, and because the first lens L1 which is on the object side from it, and composing the focusing lens is the minimum lens whose outer diameter is minimum, it is an appropriate structure for the case where the actuator 230 is arranged outside of the radial direction of the first lens L1.

This image taking lens 210 carries out the image formation of the subject image on the solid-state image sensor, when the aperture stop S, lenses of L1, L2, L3, L4 are the optical system. The aperture stop S is a member for determining F-number of the whole image taking lens system.

The IR cut filter F held by the flange part 221a of the outer cylinder 221 between the image taking lens 210 and the image sensor 251 is a member, for example, formed into about rectangular or circular.

Further, the light shielding mask SM is arranged between the third lens L3 and the fourth lens L4, and it is prevented that the unnecessary light is incident on the outside of the fourth lens L4 effective diameter near the solid-state image sensor, and the generation of ghost or flare can be suppressed.

The use embodiment of the above image taking apparatus 250 will be described. Because the view showing the condition that the image taking apparatus 150 is equipped in the cellular phone 1100 as the carrying terminal, and a control block diagram of the cellular phone 1100 are the same as the third embodiment, FIG. 14 and FIG. 15 are used as views showing them.

In the image taking apparatus 250, for example, the side-surface of the object side of the outer cylinder 221 in the image taking lens is provided on the rear surface of the cellular phone 100 (the liquid crystal display section side is the front side), and arranged in the position corresponding to the lower side of the liquid crystal display section.

The terminal 54 for external connection of the image taking apparatus 250 is connected to the control section 1101 of the cellular phone 1100, and outputs the image signal such as the brightness signal or the color difference signal to the control section 1101 side.

On the one hand, the cellular phone 1100 is provided with: as shown in FIG. 15, the control section (CPU) 1101 which generalizing-ly controls each section and conducts the program corresponding to each processing; input section 160 for supporting and inputting the number by keys; display section 170 for displaying the image-taken image or video picture other than a predetermined data; wireless communication section 180 for realizing the each kind of information communication between the external server; memory section (ROM) 191 which stores the system program of the cellular phone 1100, each kind of processing program and necessary datum such as terminal ID; and temporary memory section (RAM) 192 which is used as a working area in which each kind of processing program or datum conducted by the control section 1101, or processing data, or the image taking data by the image taking apparatus 250 is temporarily stored.

When the photographer having the cellular phone 1100 faces the optical axis of the image taking lens 210 of the image taking apparatus 250 to the object, the image signal is taken into the image sensor 251, and for example, when the image surface AF processing or the like is carried out, the focus slippage can be detected. Because the control section 1101 supplies the electric power to the actuator 230 so that the first lens L1 is driven in the direction in which this focus slippage is solved, the electric power is supplied to the coil 233 from the terminal 54 for external connection through the spring members 227, 228, the wiring H+, H−. When the magnetic force generated thereby and the energizing force of the deformed spring members 227, 228 are balanced, because together with the moving cylinder 223, the first lens L1 can be moved in the optimum focusing position between the position shown in FIG. 20 and the position shown in FIG. 21 and held, the adequate auto-focus operation can be realized. At this time, because the cylindrical surface 223c is guided along the guide cylinder part 222a, it can be accurately moved in the optical axis direction. Hereupon, when the drive force of the voice coil motor 230 is eliminated by the interruption of the electric power supply, the moving cylinder 223 returns to the condition shown in FIG. 20.

Further, at the desired shutter chance, when the photographer presses the button BT shown in FIG. 14, release is carried out, and the image signal is taken into the image taking apparatus 250. The image signal inputted from the image taking apparatus 250, stored in the memory section 192 by the control system of the cellular phone 1100 or displayed on the display section 170, further, transmitted to the outside as the image information through the wireless communication section 180.

Figure 22:
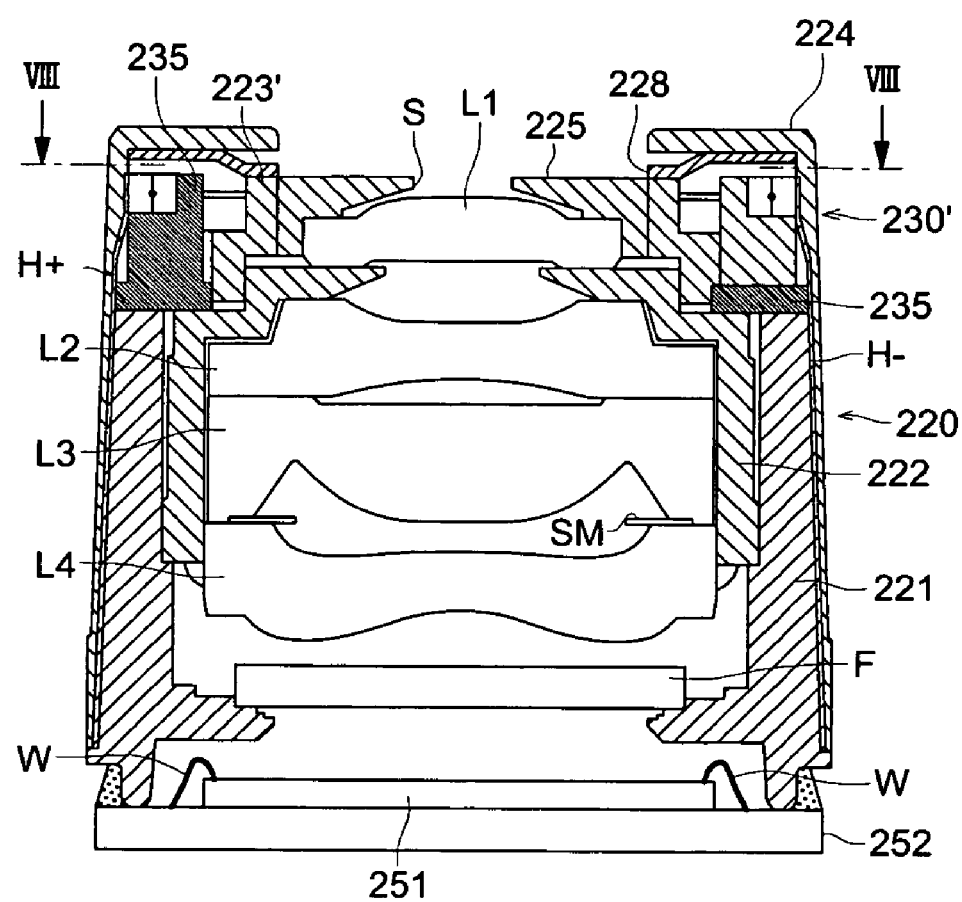
FIG. 22 is a sectional view similar to FIG. 20, of the image taking apparatus 250' according to the sixth embodiment, which can be used for the cellular phone 1100.
Figure 23:
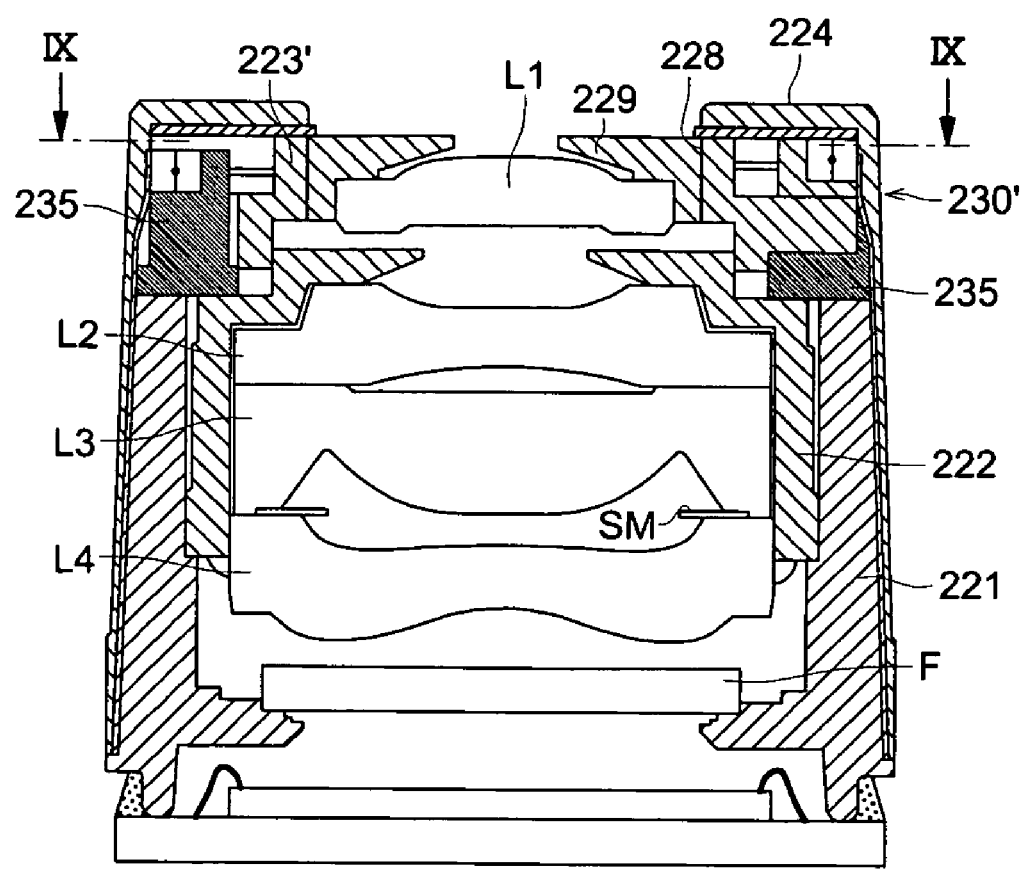
FIG. 23 is a sectional view similar to FIG. 21, of the image taking apparatus 250' according to the sixth embodiment, which can be used for the cellular phone 1100.

FIG. 22, and FIG. 23 are sectional views which are similar to FIG. 20, FIG. 21 of the image taking apparatus 250' the actuator 130' in the image taking apparatus according to the sixth embodiment usable for the cellular phone 1100. FIG. 16 is used as the view in which the image taking apparatus 250' in FIG. 22 is cut on the VIII-VIII line and viewed in the arrowed direction. FIG. 17 is used as the view in which the image taking apparatus 250' in FIG. 22 is cut on the IX-IX line and viewed in the arrowed direction. Further, for signs in FIG. 16 and FIG. 17 (130', 121, 135, 123', 136, 152), it is described as (230', 221, 235, 223', 236, 252). Further, as the view showing the relationship of the cam follower corresponding to respective of FIG. 16, FIG. 19, FIG. 18, FIG. 19 are respectively used. Further, for signs in FIG. 18 and FIG. 19 (123', 123b', 123c', 135, 135a), it is described as (223', 223b', 233c', 235, 235a). FIG. 22, FIG. 16, FIG. 18 show the situation when the actuator 230' is not turned on, and FIG. 23, FIG. 17, FIG. 19 show the situation when the actuator 230' is turned on. Hereupon, because in the present embodiment, only the structure of the actuator is different to the embodiment shown in FIG. 20, FIG. 21, the same sign is given to the common structure, and the description will be omitted.

In the present embodiment, for the actuator 230' (hereinafter, called wire SMA), the shape memory alloy is used in the form of the wire.

In FIG. 22, FIG. 23, the moving cylinder 223' energized low-ward to the cover member 224 by a spring plate 228, forms the follower 223c' (FIG. 18, FIG. 19) on the lower surface of the flange part 223b'. On the one hand, an adjusting ring 235 fitted to the upper part of the outer cylinder 221 forms a cam part 235a on its upper surface in which the height is continuously changed and the follower 223c' is slidingly moved.

In FIG. 16, FIG. 17, the left end of wire SMA formed of the shape memory alloy, is caulked and fixed to the outer cylinder 221, and the right end of the wire SMA is fixed to the moving cylinder 223'. The left end of wire SMA is electrically connected to the wiring H+, and the right end of the wire SMA is electrically connected to the wiring H−. Further, the moving cylinder 223' is linked to the outer cylinder 221 by the tension spring 236, and in FIG. 16, FIG. 17, is energized clockwise.

When by the control of the control section 1101 (FIG. 15), the electric power is supplied to the wire SMA through the wiring H+, H−, the wire SMA shrinks from the status shown in FIG. 16 by the amount corresponding to the electric power, and against the energizing force of the tension spring 236, and changed to the status shown in FIG. 17. In this case, the wire SMA rotates the moving cylinder 223' to the outer cylinder 221, and when the follower 223c' is moved along the cam 235a as shown in FIG. 18, FIG. 19, because while the moving cylinder 223' holds the first lens L1, moves toward the optical axis direction to the outer cylinder 221, the adequate focusing movement can be carried out. Hereupon, by the interruption of the electric power supply, when the wire SMA returns to the original shape, the moving cylinder 223' returns to the status shown in FIG. 22, FIG. 16.

The example of the lens optimized for focusing by the first lens which can be used for the above embodiment, will be shown below. Signs used for each example, are as follows.
f: Focal distance of the whole system of image taking lenses
fB: Back focus
F: F number
2Y: Diagonal line length of the rectangular effective pixel area of the solid-state image sensor
R: Radius of curvature
D: Surface interval on axis
Nd: Refractive index to d-line of the lens material
vd: Abbe's number of the lens material The shape of aspheric surface in each example, is expressed like that the apex of the surface is the original point, X-axis is determined in the optical axis direction, the height in the perpendicular direction to the optical axis is h, and it is expressed by the following [Math 1].

$$X = \frac{h^2/R}{1+\sqrt{1-(1+K)h^2/R^2}} + \sum A_i h^i \quad [\text{Math 1}]$$

Where,
$A_i$: I-order aspheric surface coefficient
R: Radius of curvature
K: Conical constant (Example 3 of the Image Taking Lens)

Lens data of Example 3 will be shown in Table 5, Table 6. Hereupon, after this(including the lens data of table), the exponent of 10 (for example, $2.5 \times 10^{-3}$) is expressed by using E (for example, 2.5 E-03).

TABLE 5

| f = 4.69 mm, fB = 0.42 mm, F = 2.88, 2Y = 5.63 mm | | | | |
|---|---|---|---|---|
| Surface No. | R(mm) | D(mm) | Nd | vd |
| Aperture stop | ∞ | 0.0 | | |
| 1 | 2.995 | 0.92 | 1.53180 | 56.0 |
| 2 | −13.348 | A(variable interval) | | |
| 3 | −4.778 | 0.60 | 1.58300 | 30.0 |
| 4 | 7.787 | 0.26 | | |
| 5 | 18.651 | 1.53 | 1.53180 | 0.0 |
| 6 | −1.650 | 0.11 | | |
| 7 | 2.536 | 0.75 | 1.58300 | 30.0 |
| 8 | 1.093 | 0.70 | | |
| 9 | ∞ | 0.30 | 1.51633 | 64.1 |
| 10 | ∞ | 0.20 | | |

TABLE 5-continued f = 4.69 mm, fB = 0.42 mm, F = 2.88, 2Y = 5.63 mm

| Surface No. | R(mm) | D(mm) | Nd | vd |
|---|---|---|---|---|
| 11 | ∞ | 0.50 | 1.51633 | 64.1 |
| 12 | ∞ | | | |

TABLE 6

Aspheric surface coefficient

The 1st surface

K = 2.98490E+00
A4 = −1.79490E−02
A6 = −2.45640E−03
A8 = −4.02040E−03

The 2nd surface

K = −3.62460E+01
A4 = −9.20040E−04
A6 = −4.42690E−03

The 3rd surface

K = −2.70820E+01
A4 = −2.89350E−02
A6 = 6.05970E−03
A8 = −5.58610E−04

The 4th surface

K = −7.05280E+00

The 5th surface

K = 5.00000E+01

The 6th surface

K = −3.09030E+00
A4 = −3.10370E−02
A6 = 1.51200E−02
A8 = −3.60650E−03
A10 = 5.32840E−04
A12 = −1.50890E−05

The 7th surface

K = −1.03150E+01
A4 = −5.86470E−02
A6 = 1.72540E−02
A8 = −2.54920E−03
A10 = 1.02540E−04
A12 = 5.52150E−06

The 8th surface

K = −3.64100E+00
A4 = −4.38160E−02
A6 = 1.07780E−02
A8 = −1.60330E−03
A10 = 1.10170E−04
A12 = −2.84950E−06

(Variable interval)

| | |
|---|---|
| Distance between object and image ∞: | A = 0.57 mm |
| Distance between object and image 100 mm: | A = 0.82 mm |

The variable interval A in the table is, while fB is constant value, a variable interval for focusing the object from an infinite far point to the nearest distance. When a value of this A is changed (that is, the aperture stop S and the first lens L1 are fed to the object side), the arbitrary subject can be focused from infinite point to the nearest distance.

Figure 24:
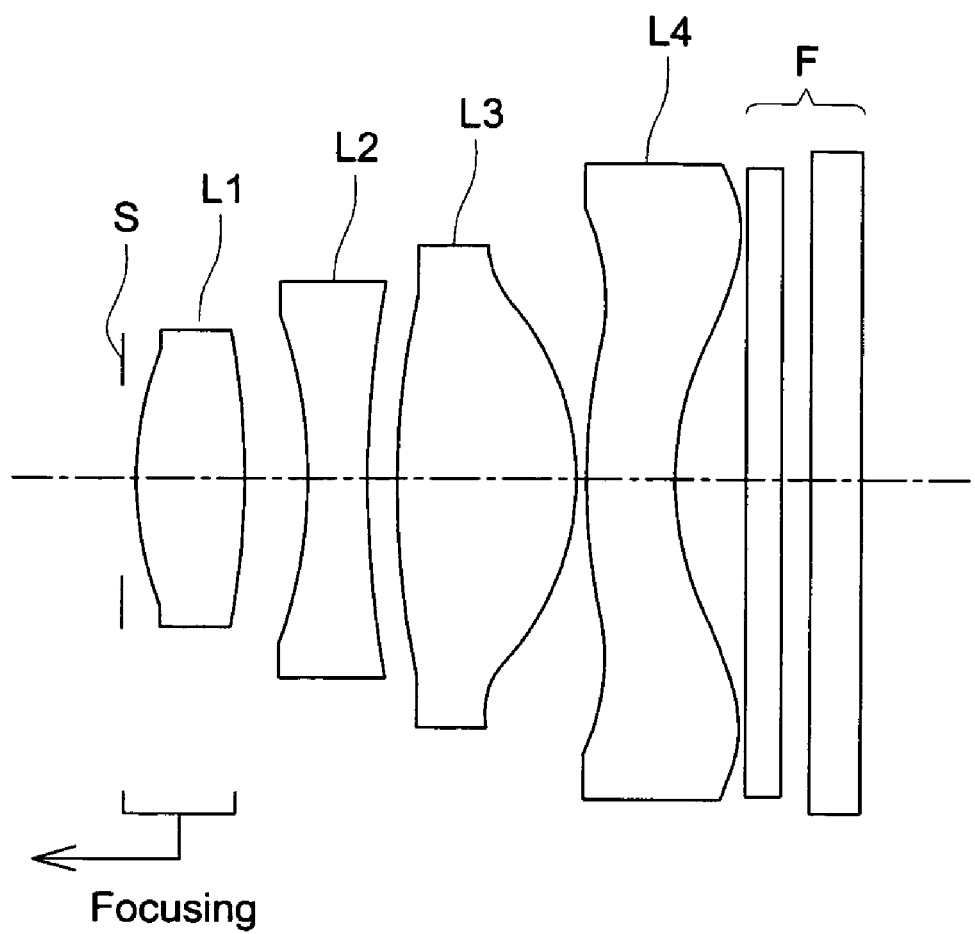
FIG. 24 is a lens sectional view in the image taking lens of Example 3.
Figure 25:
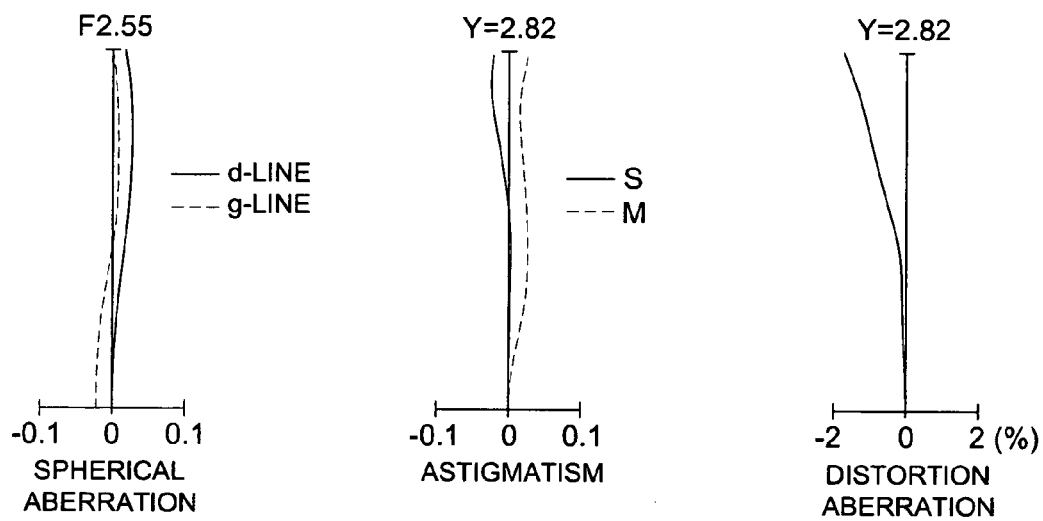
FIG. 25 is aberration views (spherical aberration, astigmatism, distortion aberration) of the image taking lens of Example 3.
Figure 25:
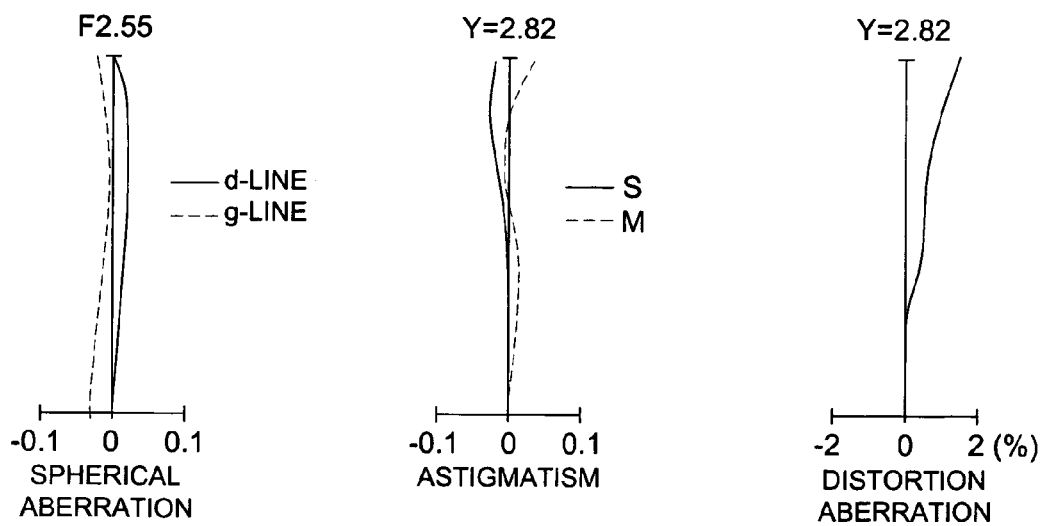

FIG. 24 is a sectional view of the lens in the image taking lens of Example 3. In the view, L1 shows the first lens, L2 shows the second lens, L3 shows the third lens, L4 shows the fourth lens, S shows the aperture stop. Further, F is the parallel planes in which the optical low pass filter or IR cut filter, the seal glass of the solid-state image sensor is assumed. FIG. 25 is aberration views (spherical aberration, astigmatism, distortion aberration) of the image taking lens of Example 1. FIG. 25(a) is an aberration view when focusing is conducted on the subject whose distance between object and image is infinite, FIG. 25(b) is an aberration view when the first lenses L1 and the stop S are integrally fed, and focusing is conducted on the subject whose distance between object and image is 10 cm. Because it is a design optimized for the focusing by the first lens L1, in the photographic area, from the distance in which between the object and image is infinite, to 10 cm, the aberration is finely corrected.

Comparative Example of the Image Taking Lens

Comparative Example of the image taking lens not optimized for the focusing by the first lens is shown. Lens data of the Comparative Example is shown in Table 7, Table 8.

TABLE 7 f = 4.69 mm, fB = 0.30 mm, F = 2.55, 2Y = 5.63 mm

| Surface No. | R(mm) | D(mm) | Nd | vd |
|---|---|---|---|---|
| Aperture stop | ∞ | 0.00 | | |
| 1 | 4.647 | 1.00 | 1.53180 | 56.0 |
| 2 | −4.052 | A(variable interval) | | |
| 3 | 38.110 | 0.80 | 1.58300 | 30.0 |
| 4 | 2.430 | 0.49 | | |
| 5 | 18.011 | 1.64 | 1.53180 | 56.0 |
| 6 | −1.650 | 0.21 | | |
| 7 | 3.321 | 0.75 | 1.58300 | 30.0 |
| 8 | 1.248 | 0.70 | | |
| 9 | ∞ | 0.30 | 1.51633 | 64.1 |
| 10 | ∞ | 0.20 | | |
| 11 | ∞ | 0.50 | 1.51633 | 64.1 |
| 12 | ∞ | | | |

TABLE 8

Aspheric surface coefficient

The 1st surface

K = 7.82250E+00
A4 = −1.95950E−02
A6 = −6.07170E−03
A8 = −1.34340E−03

The 2nd surface

K = −5.61140E+00
A4 = −1.66710E−02
A6 = 1.07700E−03

The 3rd surface

K = 1.15190E+01
A4 = −3.84980E−02
A6 = 1.31880E−02
A8 = −6.57170E−04

The 4th surface

K = −6.33940E+00

The 5th surface

K = 5.00000E+01

The 6th surface

K = −3.24280E+00
A4 = −3.59110E−02
A6 = 1.44540E−02
A8 = −3.61180E−03

TABLE 8-continued

Aspheric surface coefficient

A10 = 5.37100E−04
A12 = −1.63300E−05
The 7$^{th}$ surface

K = −1.32890E+01
A4 = −6.45530E−02
A6 = 1.73680E−02
A8 = −2.51600E−03
A10 = 1.08620E−04
A12 = 5.83140E−06
The 8$^{th}$ surface K = −3.87550E+00
A4 = −4.57170E−02
A6 = 1.05200E−02
A8 = −1.55830E−03
A10 = 1.11930E−04
A12 = −2.75120E−06

(Variable interval A)

| | |
|---|---|
| Distance between object and image ∞: | A = 0.23 mm |
| Distance between object and image 100 mm: | A = 0.44 mm |

The variable interval A in the table is, while fB is constant value, a variable interval for focusing the object from an infinite far point to the nearest distance. When a value of this A is changed (that is, the aperture stop S and the first lens L1 are fed to the object side), the arbitrary subject can be focused from infinite point to the nearest distance. However, because the image taking lens of the comparative example is not optimally designed for the focusing by the first lens, the aberration correction at the nearest distance is not enough.

Figure 26:
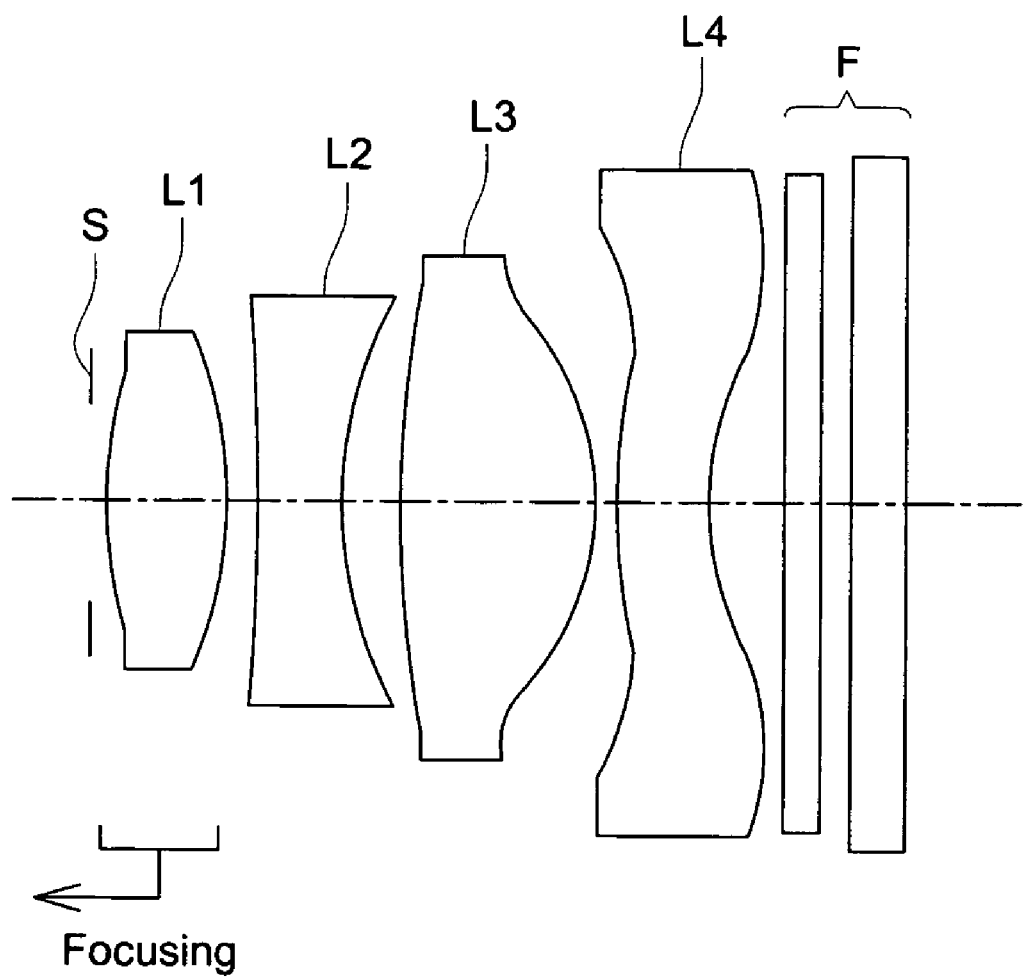
FIG. 26 is a sectional view in the image taking lens of Comparative Example.
Figure 27:
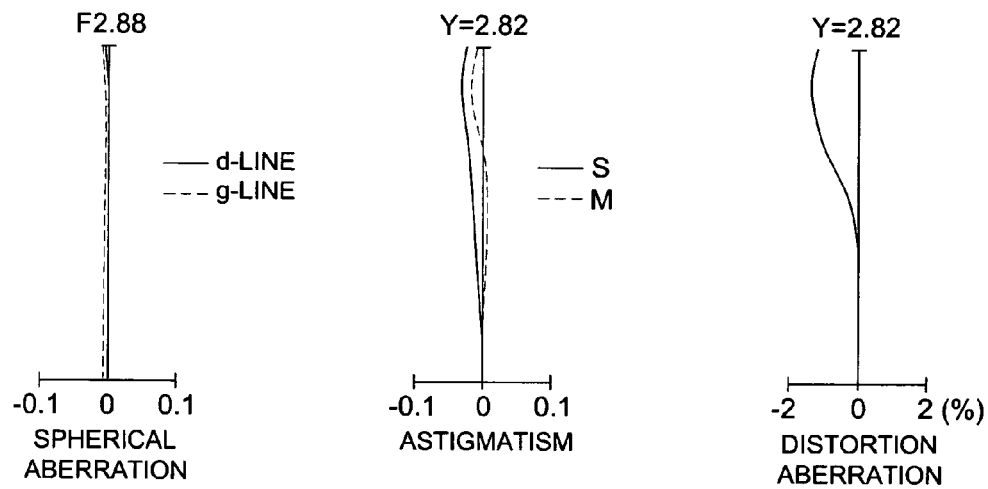
FIG. 27 is aberration views (spherical aberration, astigmatism, distortion aberration) of the image taking lens of Comparative Example.
Figure 27:
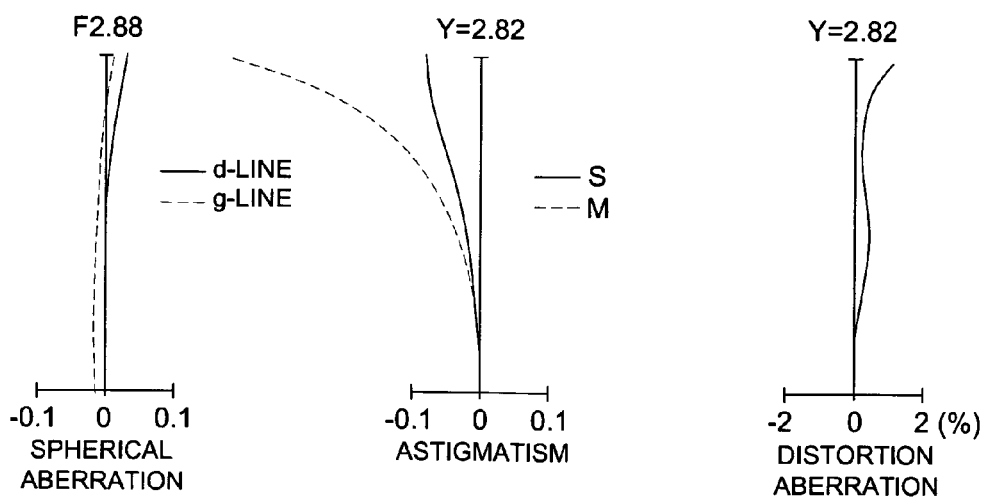

FIG. 26 is a sectional view of the image taking lens which is not optimized for the focusing by the first lens. In the view, L1 shows the first lens, L2 shows the second lens, L3 shows the third lens, L4 shows the fourth lens, S shows the aperture stop. Further, F is the parallel planes assuming to be an optical low pass filter, IR cut filter, or a seal glass of the solid-state image sensor. FIG. 27 is aberration views (spherical aberration, astigmatism, distortion aberration) of the image taking lens of Comparative Example. FIG. 27(a) is an aberration view when focusing is conducted on the subject whose distance between object and image is infinite, FIG. 27(b) is an aberration view when the first lenses L1 and the stop S are integrally fed, and focusing is conducted on the subject whose distance between object and image is 10 cm. When compared to the aberration view of the first embodiment, because it is not the image taking lens optimized for the focusing by the first lens L1, the image surface distortion (particularly, meridional) at the distance in which between object and image is 10 cm, is extremely large, and it is found that the fine image quality can not be obtained in the photographing of the nearest distance of 10 cm.

Figure 28:
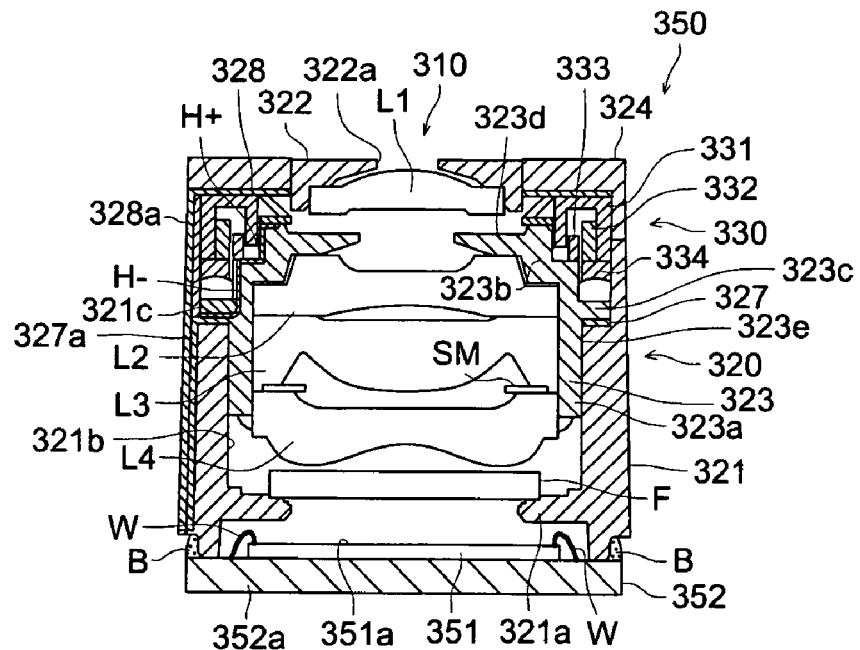
FIG. 28 is a sectional view in which the image taking apparatus 150 of FIG. 11 in the inactivation status is cut along the surface including II-II line.
Figure 29:
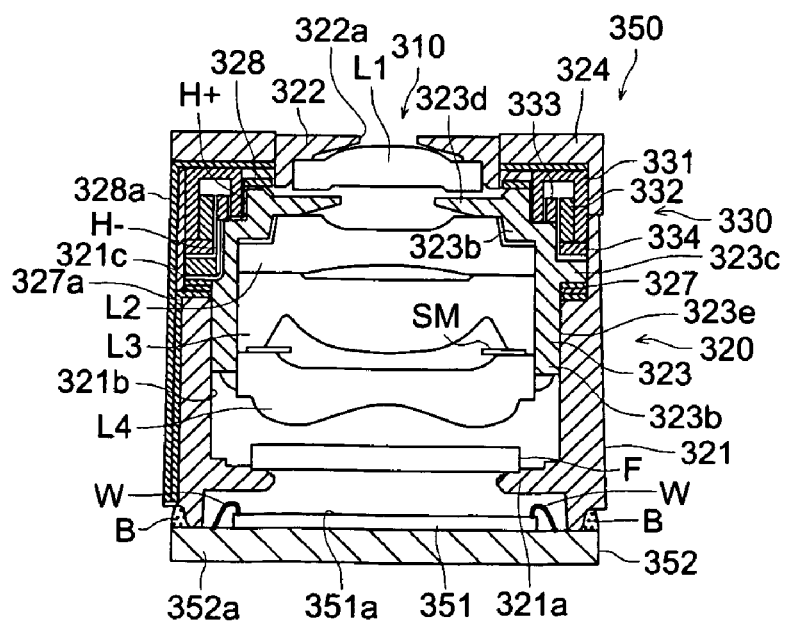
FIG. 29 is a sectional view in which the image taking apparatus 150 of FIG. 11 in the activation status is cut along the surface including II-II line.

Next, based on the drawings, the seventh embodiment of the present invention will be described. Hereupon, because the external view of the image taking apparatus 350 according to the seventh embodiment is common to the third embodiment, the perspective view will be described by using FIG. 11. FIG. 28, FIG. 29 are sectional views in which the image taking apparatus 150 of FIG. 11 (in FIG. 28 and FIG. 29, corresponds to 350), is cut along the surface including II-II line, and FIG. 28 shows the status when the coil of the actuator is not turned on, and FIG. 29 shows the status when the coil of the actuator is turned on.

The image taking apparatus 350 is provided with: CMOS type image sensor 251 as the solid-state image sensor having the photoelectric conversion section 351a; the image taking lens 310 as the image taking lens which image-takes the subject image in the photoelectric conversion section 351a of this image sensor 351; the IR cut filter F arranged between the image sensor 351 and the image taking lens 310; the substrate 352 having the terminal 54 for external connection (refer to FIG. 11) which holds the image sensor 351 and sends and receives its electric signal; the assembling casing 320 for supporting the image taking lens; and the actuator 330 for driving the focusing lens, and they are integrally formed. Hereupon, the optical direction height A of the present image taking apparatus 350 is less than 10 mm.

In the above image sensor 351, the photoelectric conversion section 351a as the light receiving section in which the pixels (photoelectric conversion element) are 2-dimensionaly arranged, is formed in the central part of the plane of its light receiving side, and in its surrounding area, the signal processing circuit (not shown) is formed. Such a signal processing circuit comprises the drive circuit section for successively driving each pixel, and for obtaining the signal charge, A/D conversion section for converting each signal charge into the digital signal, and the signal processing section for forming the image signal output by using this digital signal. Further, in the vicinity of outer edge of the plane on the light receiving side of the image sensor 351, numbers of pads (the figure is omitted) are arranged, and connected to the substrate 351 through wire W. The image sensor 351 converts the signal charge from the photoelectric conversion section 351a into the image signal such as the digital YUV signal, and outputs to a predetermined circuit on the substrate 352 through the wire W. Herein, Y is the brightness signal, U (=R−Y) is the color difference signal of red and the brightness signal, V (=B−Y) is the color difference signal of blue and the brightness signal. Hereupon, the image sensor is not limited to the above CMOS type image sensor, but the other sensor such as CCD may also be used.

The substrate 352 is provided with a support flat plate 352a supporting the above image sensor 351 and the outer cylinder 321 on its one plane, and the flexible substrate 351b (corresponds to 151b in FIG. 11) whose one end part is connected to the support flat plate 352a.

The support flat plate 352a has many number of pads for signal transmission provided on the surface, and this is connected to the wire W from the image sensor 351, and connected to the flexible substrate 352b.

The flexible substrate 351b is, as described above, its one end part is connected to the support flat plate 352a, and through the terminal 54 for external connection provided on it's other end part, the support flat plate 352a and the external circuit (for example, the control circuit owned by the higher rank apparatus in which the image taking apparatus is equipped) are connected, and from the external circuit, the voltage for driving the image sensor 351, or the clock signal is supplied, or the digital YUV signal can be outputted to the external circuit. Further, the intermediate part of the longitudinal direction of the flexible substrate 351b has the flexibility or deformation easiness, and by the deformation, to the support flat plate 352a, the degree of freedom is given for the aspect or arrangement of the external output terminal.

The assembling casing 320 formed of the light shielding member, comprises the outer cylinder (called also fixing member) 321 which is arranged in such a manner to surround the image sensor 351, and whose lower end is adhered by using the adhesive agent B to the support flat plate 352a, the moving cylinder 323 arranged inside the outer cylinder 321 and movable, and the cover member 324 which is arranged above the outer cylinder 321. To the flange part 321a extendedly existing from the inner periphery to the inside of the radial direction, the IR cut filter F is fitted.

The moving cylinder 323 is a structure which has the cylinder small diameter part 323b above the cylinder large diameter part 323a, further, the flange part 323c extendedly existing to the outside of the radial direction is formed in the intermediate of the cylinder large diameter part 323a. Between the flange part 323c and an inner periphery step part 321c, the spring member 327 is arranged, and to the outer cylinder 321, forces the flange part 323c in the optical axis direction. In the inside of the moving cylinder 323, from the object side, the second lens L2, the third lens L3, the fourth lens L4 are, in this order, fixedly involved and held. In the object side of the second lens L2, the mask part 323d extendedly existing flange-likely from the inner peripheral surface of of the cylinder small diameter part 323b, to the inside of the radial direction is formed. The outer peripheral surface 323e of the cylinder large diameter part 323a positioned on the image sensor 351 side from the actuator 330, and positioned at least on the periphery of the fourth lens L4, is the guide cylinder part (called also guide part, or cylindrical surface), and engaged with the inner peripheral surface (called also the guide cylinder surface) 321b movably in the optical axis direction.

On the upper part of the outer cylinder 321, the donut disc-like cover member 324 is fitted, and on the inner peripheral surface of the cover member 324, the holder 322 fixedly holding the first lens L1 is fixed. The object side of the holder 322 has a shape that, except the central aperture (aperture stop) 322a, is shielded. On the lower surface of the cover member 324, the disc-like spring member 328 is arranged. On the one hand, with the upper end of the cylinder small diameter part 323b, one part of the spring member 328 comes into contact, to the cover member 324, forces the moving cylinder 323 in the optical axis direction.

The actuator 330 which is a ring like voice coil motor, has a yoke 331 fixedly arranged in the space which is the outside of the radial direction of the first lens L1, and between the cylinder small diameter part 323b of the moving cylinder 323 and the cover member 324, in the inner periphery of the outer cylinder 321 through the linking member 334, the magnet 332 fixed in the yoke 331 through the linking member 334, and the coil 333 whose lower end is fitted to the upper end of the cylinder large diameter part 323a of the moving cylinder 323. The plus terminal of the coil 333 is connected to the spring member 328 through the flexible wiring H+ extendedly existing along the outer peripheral surface of the cylinder small diameter part 323b of the moving cylinder 323. Further, the minus terminal of the coil 333 is connected to the spring member 327 through the flexible wiring H− extendedly existing along the upper part outer wall of the cylinder large diameter part 323a of the moving cylinder 323. A part of the spring members 327, 328, as the wiring part 327a, 328a (they are insulated from each other), comes to the substrate 352 along the outer wall of the outer cylinder 321.

The image taking lens 310 has, in order from the object side, the aperture stop 322a, the first lens L1 having the positive refractive power, and whose convex surface faces the object side, the second lens L2 having the negative refractive power, the third lens L3 having the positive refractive power, the fourth lens L4 having the negative refractive power. The lenses L1, L2, L3, L4 are housed in the inside of the assembling casing under the condition that their optical axis and the central line of the outer cylinder 321 are coincident. The lenses L2-L4 integrally fixed by the moving cylinder 323, compose the focusing lens. In the seventh embodiment, because the fourth lens L4 composes the most image side lens, and the first lens L1 is the minimum lens whose outer diameter is minimum, it is an appropriate structure for the case where the actuator 330 is arranged outside of the radial direction of the first lens L1.

This image taking lens 310 carries out the image formation of the subject image on the solid-state image sensor, when the aperture stop S, lenses of L1, L2, L3, L4 are the optical system. The aperture stop 322a is a member for determining F-number of the whole image taking lens system.

The IR cut filter F held by the flange part 321a of the outer cylinder 321 between the image taking lens 310 and the image sensor 51 is a member, for example, formed into about rectangular or circular.

Further, the light shielding mask SM is arranged between the third lens L3 and the fourth lens L4, and it is prevented that the unnecessary light is incident on the outside of the fourth lens L4 effective diameter near the solid-state image sensor, and the generation of ghost or flare can be suppressed.

The use embodiment of the above image taking apparatus 350 will be described. Because the view showing the condition that the image taking apparatus 350 is equipped in the cellular phone 1100 as the carrying terminal, and a control block diagram of the cellular phone 1100 are the same as the third embodiment, FIG. 14 and FIG. 15 are used as views showing them.

In the image taking apparatus 350, for example, the side-surface of the object side of the outer cylinder 321 in the image taking lens is provided on the rear surface of the cellular phone 100 (the liquid crystal display section side is the front side), and arranged so that it is in the position corresponding to the lower side of the liquid crystal display section.

The terminal 54 for external connection of the image taking apparatus 350 is connected to the control section 1101 of the cellular phone 1100, and outputs the image signal such as the brightness signal or the color difference signal to the control section 1101 side.

On the one hand, the cellular phone 1100 is provided with: as shown in FIG. 15, the control section (CPU) 1101 which generalizing-ly controls each section and conducts the program corresponding to each processing; input section 160 for supporting and inputting the number by keys; display section 170 for displaying the image-taken image or video picture other than a predetermined data; wireless communication section 180 for realizing the each kind of information communication between the external server; memory section (ROM) 191 which stores the system program of the cellular phone 1100, each kind of processing program and necessary datum such as terminal ID; and temporary memory section (RAM) 192 which is used as a working area in which each kind of processing program or datum conducted by the control section 1101, or processing data, or the image taking data by the image taking apparatus 350 is temporarily stored.

When the photographer having the cellular phone 1100 faces the optical axis of the image taking lens 310 of the image taking apparatus 350 to the object, the image signal is taken into the image sensor 151, and for example, when the image surface AF processing or the like is carried out, the focus slippage can be detected. Because the control section 1101 supplies the electric power to the actuator 330 so that the first lens L1 is driven in the direction in which this focus slippage is solved, the electric power is supplied to the coil 233 from the terminal 54 for external connection through the spring members 327, 328, the wiring H+, H−. When the magnetic force generated thereby and the energizing force of the deformed spring members 227, 228 are balanced, because the moving cylinder 323 is moved in the optical direction, the lenses L2-L4 can be moved in the optimum focusing position between the position shown in FIG. 28 and the position shown in FIG. 29 and held, the adequate auto-focus operation can be realized. At this time, because in the outer peripheral surface 323e of the cylinder large diameter part 323a, its optical axis direction length is about ¼ of the total length of the image taking apparatus and comparatively long, when it is slidingly moved along the inner peripheral surface 321b of the outer cylinder 321 while the guide function is exerted as the guide cylinder part, the near race between both is suppressed, and smooth focusing operation can be realized. Hereupon, when the drive force of the voice coil motor 330 is eliminated by the interruption of the electric power supply, the moving cylinder 323 returns to the condition shown in FIG. 28.

Further, at the desired shutter chance, when the photographer presses the button BT shown in FIG. 14, releasing is carried out, and the image signal is taken into the image taking apparatus 350. The image signal inputted from the image taking apparatus 350, is stored in the memory section 192 by the control system of the cellular phone 1100 or displayed on the display section 170, further, transmitted to the outside as the image information through the wireless communication section 180.

As described above, the seventh embodiment is described, however, as the structure of the actuator, the shape memory alloy can also be used in a form of wire as shown in the fourth embodiment.

Figure 30:
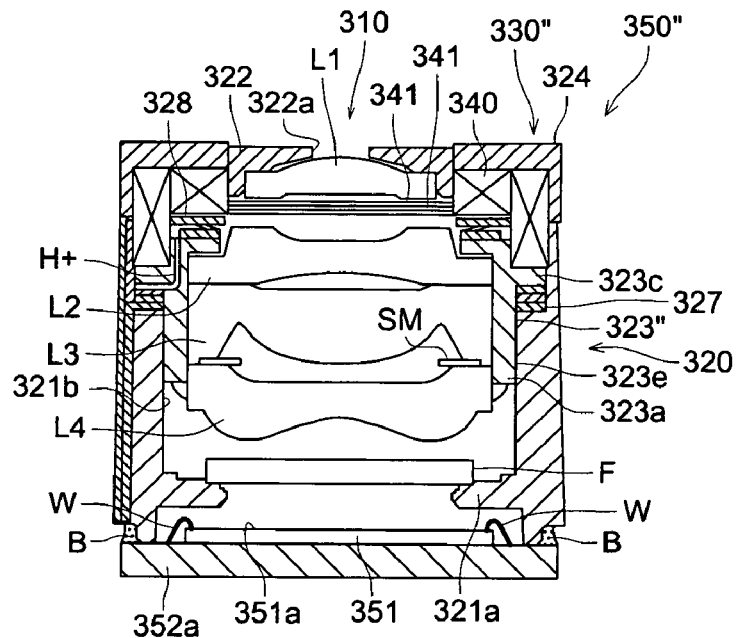
FIG. 30 is a sectional view of an image taking apparatus 350" according to the eighth embodiment.
Figure 31:
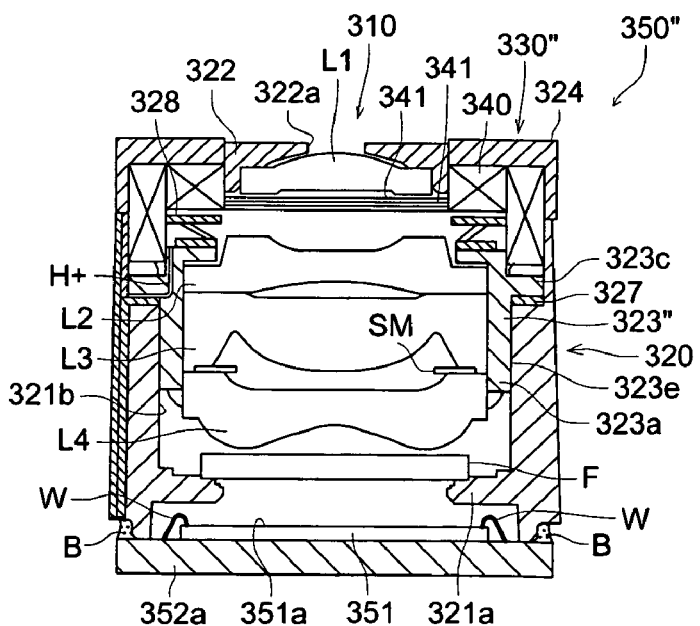
FIG. 31 is a sectional view of an image taking apparatus 350" according to the eighth embodiment.

FIG. 30, FIG. 31 are sectional views of the image taking apparatus which can be used for the cellular phone 1100 according to the eighth embodiment, and FIG. 30 shows the status when the actuator 330" is not turned on, and FIG. 31 shows the status when the actuator 330" is turned on. Hereupon, the eighth embodiment will describe only different point from the seventh embodiment shown in FIG. 28, FIG. 29, and to the common structure, the same sign is given, and the description is omitted.

In the present embodiment, the moving cylinder 323" does not have the cylinder small diameter part. By using the space generated thereby, in the space of inner periphery side of the cover member 324 in the outside of radial direction of the first lens L1, the ring-shaped actuator 330" is arranged. Further, on the lower surface of the cover member 324 which is the outside of radial direction of the first lens L1 and on the inner periphery side of the actuator 330", the shutter actuator 340 is arranged. The shutter actuator 340 drives 2 shutter blades 341, 341 in the manner that they can be opened and closed. Because the shutter device comprising the shutter actuator 340 and shutter blades 341, 341 is well known, the detail is not described.

According to the eighth embodiment, because, by the shutter actuator 340, the shutter blades 341, 341 are opened for a predetermined exposure time, even when the image sensor 351 is made high pixel, the read-out of the image data can be adequately carried out. Further, because the actuator 330" and the shutter actuator 340 are arranged by using the space of the outside of the radial direction of the first lens L1 having the small outer diameter, the down sizing of the image taking apparatus can be intended.

Figure 32:
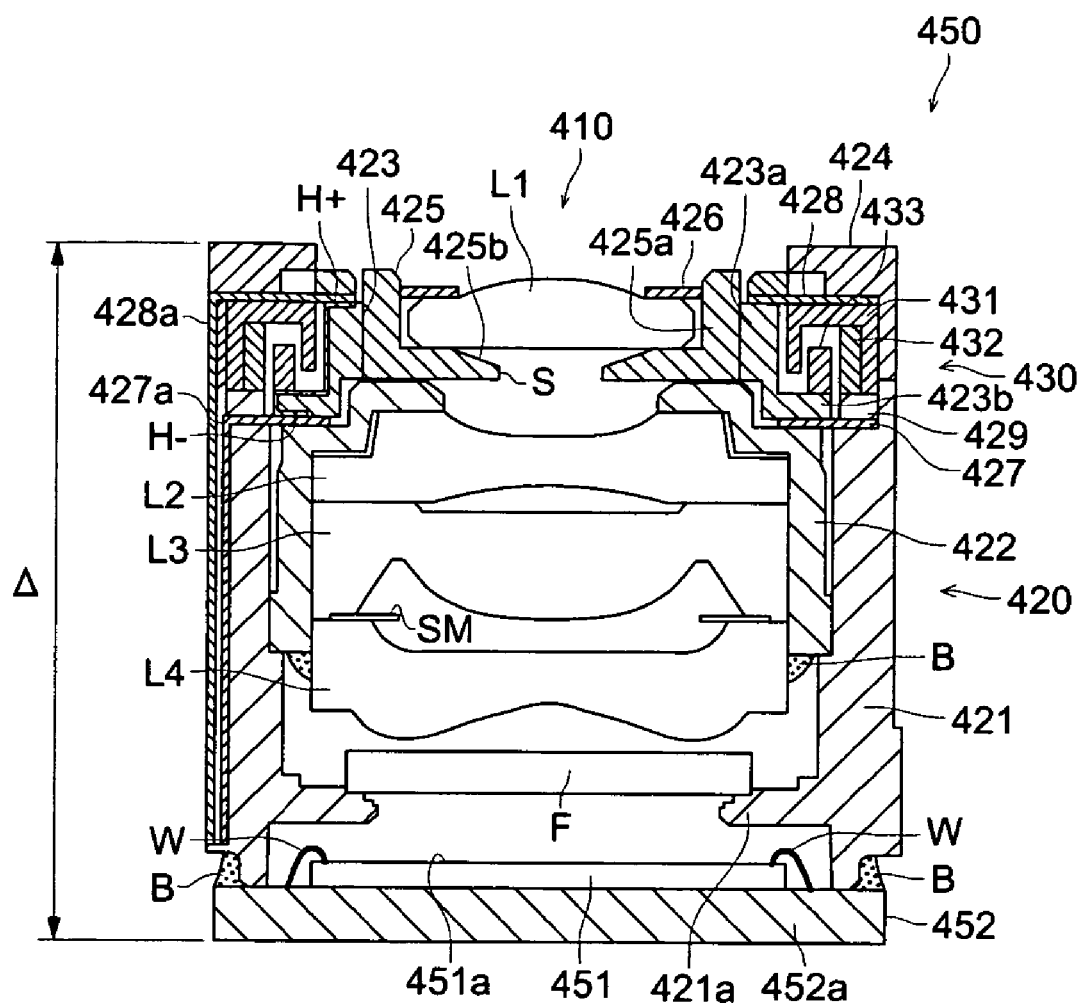
FIG. 32 is a sectional view in which the image taking apparatus 150 of FIG. 11 in the inactivation status is cut along the surface including II-II line.
Figure 33:
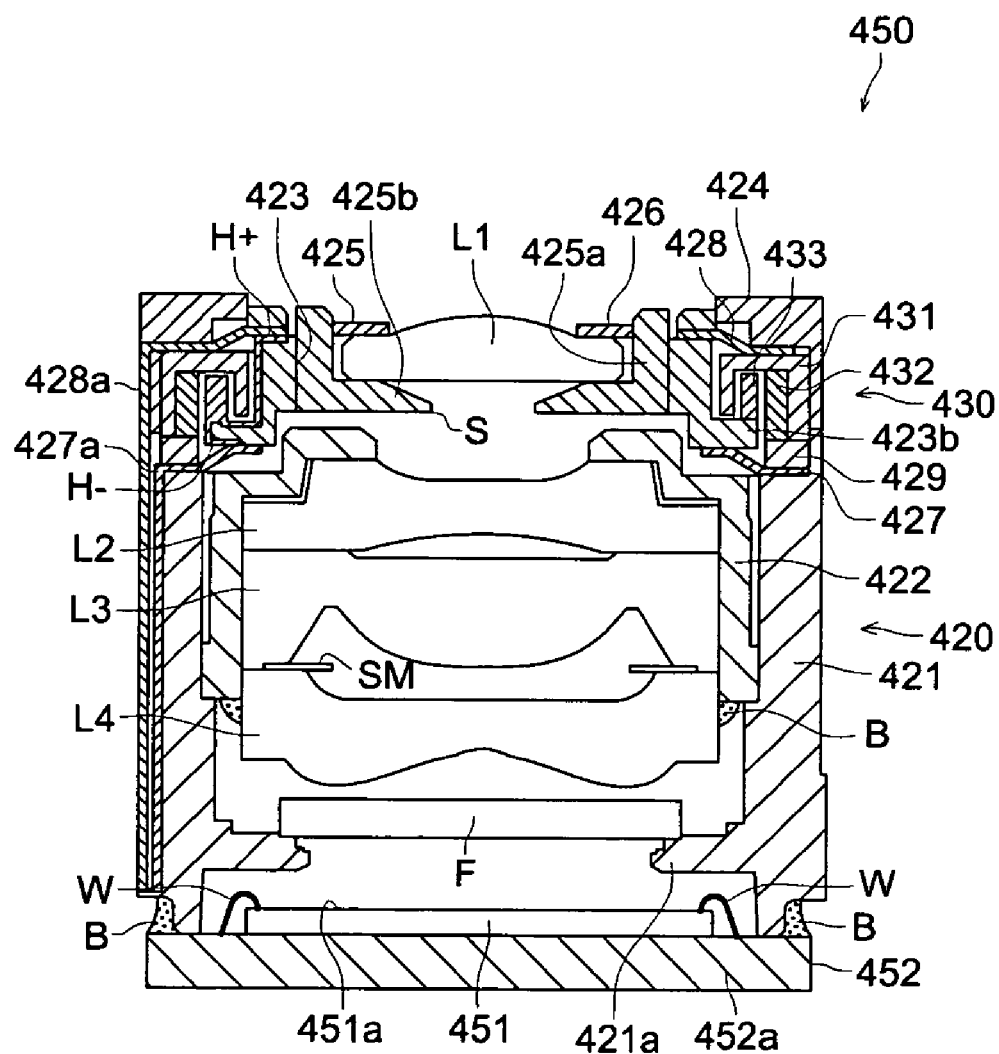
FIG. 33 is a sectional view in which the image taking apparatus 150 of FIG. 11 in the activation status is cut along the surface including II-II line.

Next, based on the drawings, the seventh embodiment of the present invention will be described. Hereupon, because the external view of the image taking apparatus 450 according to the ninth embodiment is common to the third embodiment, the perspective view will be described by using FIG. 11. FIG. 32, FIG. 33 are sectional views in which the image taking apparatus 150 of FIG. 11 (in FIG. 32 and FIG. 33, corresponds to 450), is cut along the surface including II-II line, and FIG. 32 shows the status when the coil of the actuator is not turned on, and FIG. 33 shows the status when the coil of the actuator is turned on.

The image taking apparatus 450 is provided with: CMOS type image sensor 451 as the solid-state image sensor having the photoelectric conversion section 451a; the image taking lens 410 as the image taking lens which image-takes the subject image in the photoelectric conversion section 451a of this image sensor 451; the IR cut filter F arranged between the image sensor 451 and the image taking lens 410; the substrate 352 having the terminal 54 for external connection (refer to FIG. 11) which holds the image sensor 451 and sends and receives its electric signal; the assembling casing 420 for supporting the image taking lens; and the actuator (called also the focus actuator)430 for driving the focusing lens, and they are integrally formed. Hereupon, the optical axis direction height Δ of the present image taking apparatus 450 is less than 10 mm.

In the above image sensor 451, the photoelectric conversion section 451a as the light receiving section in which the pixels (photoelectric conversion element) are 2-dimensionaly arranged, is formed in the central part of the plane of its light receiving side, and in its surrounding area, the signal processing circuit (not shown) is formed. Such a signal processing circuit comprises the drive circuit section for successively driving each pixel, and for obtaining the signal charge, A/D conversion section for converting each signal charge into the digital signal, and the signal processing section for forming the image signal output by using this digital signal. Further, in the vicinity of outer edge of the plane on the light receiving side of the image sensor 451, numbers of pads (the figure is omitted) are arranged, and connected to the substrate 351 through wire W. The image sensor 451 converts the signal charge from the photoelectric conversion section 351a into the image signal such as the digital YUV signal, and outputs to a predetermined circuit on the substrate 352 through the wire W. Herein, Y is the brightness signal, U (=R−Y) is the color difference signal of red and the brightness signal, V (=B−Y) is the color difference signal of blue and the brightness signal. Hereupon, the image sensor is not limited to the above CMOS type image sensor, but the other sensor such as CCD may also be used.

The substrate 452 is provided with a support flat plate 452a supporting the above image sensor 451 and the outer cylinder 421 on its one plane, and the flexible substrate 451b (FIG. 1) whose one end part is connected to the support flat plate 452a.

The support flat plate 352a has many number of pads for signal transmission provided on the surface, and this is connected to the wire W from the image sensor 451, and connected to the flexible substrate 452b.

The flexible substrate 451b is, as described above, its one end part is connected to the support flat plate 452a, and through the terminal 54 for external connection provided on it's other end part, the support flat plate 452a and the external circuit (for example, the control circuit owned by the higher rank apparatus in which the image taking apparatus is equipped) are connected, and from the external circuit, the voltage for driving the image sensor 451, or the clock signal is supplied, or the digital YUV signal can be outputted to the external circuit. Further, the intermediate part of the longitudinal direction of the flexible substrate 451b has the flexibility or deformation easiness, and by the deformation, to the support flat plate 452a, the degree of freedom is given for the aspect or arrangement of the external output terminal.

The assembling casing 420 formed of the light shielding member, comprises the outer cylinder 421 which is arranged in such a manner to surround the image sensor 351, and whose lower end is adhered by using the adhesive agent B to the support flat plate 452a, the inner cylinder 422 arranged inside the outer cylinder 421, the moving cylinder 423 arranged above the inner cylinder 422 and movable, and the cover member 424 which is arranged outside of the moving cylinder 423.

To the flange part 421a extendedly existing from the inner periphery of the outer cylinder 421 to the inside of the radial direction, the IR cut filter F is fitted. The inner cylinder 422 whose lower end outer periphery is engaged with the outer cylinder 421, in order of, from the object side, the second lens L2, the third lens L3, the fourth lens L4, Fixedly involves and holds them.

The moving cylinder 423 has the cylindrical main body 423a, and the flange part 423b formed on the lower end which is its image side end. The main body 423a of the moving cylinder 423 involves and holds the holder (called also holding frame) 425 holding the first lens L1. The holder 425 has the hollow cylindrical main body 425a having inner periphery larger (for example, larger than 100 μm in the radius) than the outer periphery of the first lens L1, and the flange part 425b arranged on the image side of the first lens L1, and its central aperture is the aperture stop S. Further, in the inner periphery of the main body 425a, a donut-disc like pressing member 426 is fitted to the object side of the first lens L1, and the first lens L1 is sandwiched between the pressing member 426 and the flange part 425b in the optical axis direction.

The lower surface of the flange part 423b of the moving cylinder 423 is in contact with the upper surface of the spring disc 427 whose outer periphery side is fixed by the screw member 429 screwed on the upper end of the outer cylinder 421. The upper part of the main body 423a of the moving cylinder 423 is in contact with the lower surface of the spring member 428 whose outer periphery side is sandwiched between the cover member 424 fitted to the upper end of the outer cylinder 421, and the yoke 431 of the actuator 430. The spring members 427, 428 on the free condition, has about the shape shown in FIG. 32, that is, on the deformed condition shown in FIG. 33, by its spring force, the moving cylinder 423 is forced downward.

The actuator 430 which is a ring like voice coil motor, has a yoke 431 arranged in the space which is the outside of the radial direction of the first lens L1, and above the outer cylinder 421 and in its outer periphery, in such a manner that it is sandwiched between the outer cylinder 421 and the cover member 424, the magnet 432 fixed in the yoke 431, and the coil 433 whose lower end is fitted to the flange part 423b of the moving cylinder 423. The plus terminal of the coil 433 is connected to the spring member 428 through the flexible wiring H+ extendedly existing along the outer wall of the main body 423a of the moving cylinder 423. Further, the minus terminal of the coil 333 is connected to the spring member 427 through the flexible wiring H− extendedly existing along the outer wall of the flange part 423b of the moving cylinder 423. A part of the spring members 427, 428, as the wiring part 427a, 428a (they are insulated from each other), comes to the substrate 452 along the outer wall of the outer cylinder 421. Because the drive principle of the voice coil motor is well known, description is omitted, however, by the magnetic force generated when, from the outside, through the spring members 427, 428, wiring H+, H−, the electric power is supplied to the coil 433, to the magnet 432, the coil 433 can be dislocated corresponding to the supplied electric power.

The image taking lens 410 has, in order from the object side, the first lens L1 having the positive refractive power, and whose convex surface faces the object side, the aperture stop S, the second lens L2 having the negative refractive power, the third lens L3 having the positive refractive power, the fourth lens L4 having the negative refractive power. The lenses L1, L2, L3, L4 are housed in the inside of the assembling casing 420 under the condition that their optical axis and the central line of the outer cylinder 421 are coincident, when they are assembled by the assembling method which will be described later. The lenses L2-L4 integrally fixed by the moving cylinder 323, compose the focusing lens. In the ninth embodiment, because the fourth lens L4 composes the most image side lens, and the first lens L1 which is on the object side from that and composes the focusing lens is the minimum lens whose outer diameter is minimum, it is an appropriate structure for the case where the actuator 430 is arranged outside of the radial direction of the first lens L1.

This image taking lens 410 carries out the image formation of the subject image on the solid-state image sensor, when the aperture stop S, lenses of L1, L2, L3, L4 are the optical system. The aperture stop S is a member for determining F-number of the whole image taking lens system.

The IR cut filter F held by the flange part 421a of the outer cylinder 421 between the image taking lens 410 and the image sensor 451 is a member, for example, formed into about rectangular or circular.

Further, the light shielding mask SM is arranged between the third lens L3 and the fourth lens L4, and it is prevented that the unnecessary light is incident on the outside of the fourth lens L4 effective diameter near the solid-state image sensor, and the generation of ghost or flare can be suppressed.

The assembling method of the image taking apparatus 450 according to the ninth embodiment will be described below. Initially, the lower end of the outer cylinder 421 is adhered onto the supporting flat plate 452a to which the image sensor 451 is fitted. To that, the IR cut filter F is fitted, and the inner cylinder 422 fixed by the adhesive agent B so that the optical axes of lenses L2-L4 are coincident, is engaged with that. Further, after, on the upper end of the outer cylinder 421, the actuator 430 and the moving cylinder 423 in which the holder 425 are fixed by using the cover member 424, the first lens L1 is assembled in the holder 425, and by using the pressing member 426, they are temporarily assembled.

On such a condition, when the inspection light is incident from the first lens L1, because through lenses L1-L4, it is image formed on the light receiving surface of the image sensor 451, when the signal from the image sensor 451 is analyzed, the degree of center-axis slippage of the lens L1 and lenses 2-L4 is found. Accordingly, when the lens L1 is dislocated in the optical axis orthogonal direction so that the center-axis slippage is suppressed, because the optical axes of the lens L1 and lenses L2-L4 are coordinated, when while its center-axis adjusting condition is kept, through the pressing member 426, the first lens L1 is fixed on the holder 425, the center-axis slippage adjustment is completed. Hereupon, the fixing of the first lens L1 is not limited to the adhesion by using the adhesive agent, laser welding may also be used.

According to the ninth embodiment, because it is the structure in which the first lens L1 which the focusing lens, and lenses L2-L4 which are fixed lenses, are center-axis adjustable, at the assembling, when the lens L1 and lenses L2-L4 are center-axis adjusted and accurately positioned, at the movement, even when the lens L1 is moved in the optical axis direction for the focusing, it is suppressed that the allowable range of the center-axis slippage is exceeded, thereby, the image of high image quality can be obtained.

The use embodiment of the above image taking apparatus 450 will be described. Because the view showing the condition that the image taking apparatus 450 is equipped in the cellular phone 1100 as the carrying terminal, and a control block diagram of the cellular phone 1100 are the same as the third embodiment, FIG. 14 and FIG. 15 are used as views showing them.

In the image taking apparatus 450, for example, the end-surface of the object side of the outer cylinder 421 in the image taking lens is provided on the rear surface of the cellular phone 1100 (the liquid crystal display section side is the front side), and arranged so that it is in the position corresponding to the lower side of the liquid crystal display section.

The terminal 54 for external connection of the image taking apparatus 450 is connected to the control section 1101 of the cellular phone 1100, and outputs the image signal such as the brightness signal or the color difference signal to the control section 1101 side.

On the one hand, the cellular phone 1100 is provided with: as shown in FIG. 15, the control section (CPU) 1101 which generalizing-ly controls each section and conducts the program corresponding to each processing; input section 160 for supporting and inputting the number by keys; display section 170 for displaying the image-taken image or video picture other than a predetermined data; wireless communication section 180 for realizing the each kind of information communication between the external server; memory section (ROM) 191 which stores the system program of the cellular phone 1100, each kind of processing program and necessary datum such as terminal ID; and temporary memory section (RAM) 192 which is used as a working area in which each kind of processing program or datum conducted by the control section 1101, or processing data, or the image taking data by the image taking apparatus 450 is temporarily stored.

When the photographer having the cellular phone 1100 faces the optical axis of the image taking lens 410 of the image taking apparatus 450 to the object, the image signal is taken into the image sensor 451, and for example, when the image surface AF processing or the like is carried out, the focus slippage can be detected. Because the control section 1101 supplies the electric power to the actuator 430 so that the first lens L1 is driven in the direction in which this focus slippage is solved, the electric power is supplied to the coil 433 from the terminal 54 for external connection through the spring members 427, 428, the wiring H+, H−. When the magnetic force generated thereby and the energizing force of the deformed spring members 427, 428 are balanced, because together with the moving cylinder 423, the first lens L1 can be moved to the optimum focus position between the position shown in FIG. 32, and held, the adequate auto-focus operation can be realized. Hereupon, when the drive force of the voice coil motor 430 is eliminated by the interruption of the electric power supply, the moving cylinder 423 returns to the condition shown in FIG. 32.

Further, at the desired shutter chance, when the photographer presses the button BT shown in FIG. 14, releasing is carried out, and the image signal is taken into the image taking apparatus 450. The image signal inputted from the image taking apparatus 450, is stored in the memory section 192 by the control system of the cellular phone 1100 or displayed on the display section 170, further, transmitted to the outside as the image information through the wireless communication section 180.

Figure 34:
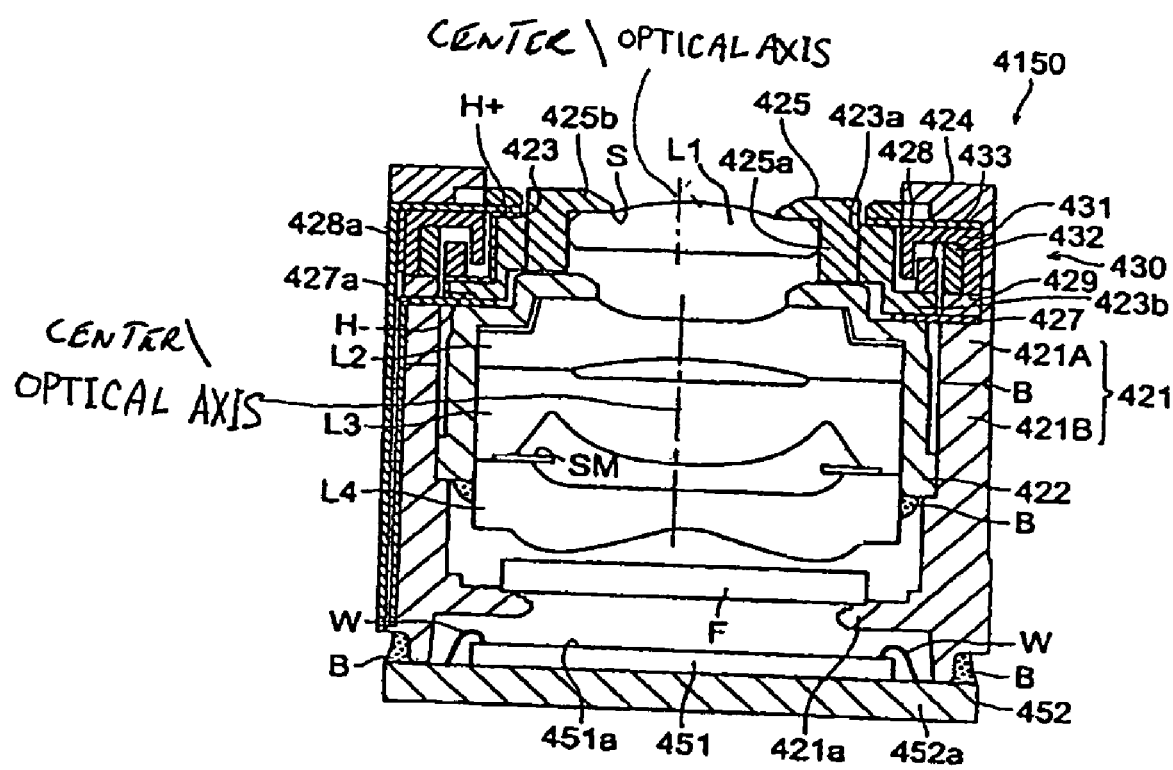
FIG. 34 is a sectional view of an image taking apparatus 4150 according to the ninth embodiment.

FIG. 34 is a sectional view similar to FIG. 32 of the image taking apparatus 4150 according to the tenth embodiment which can be used for the cellular phone 1100. Hereupon, the present embodiment, in the embodiment shown in FIG. 32, FIG. 33, to the common structure, the same sign is given and the explanation will be omitted.

In FIG. 34, the outer cylinder 421 comprises 2 parts of the upper part 421A and the lower part 421B. Further, in the tenth embodiment, the pressing member is not provided, the first lens L1 is directly fixed to the holder 425. In the center of the flange part 425b formed on the image side of the holder 425, the aperture stop S is formed. Hereupon, among the outer peripheral surface of the inner cylinder 422, the inner peripheral surface of the upper part 421A and the inner peripheral surface of the moving cylinder 423, gaps more than 100 μm, are provided.

The assembling method of the image taking apparatus 4150 according to the present embodiment will be described below. Initially, to the upper end of the upper part 421A of the outer cylinder 421, the actuator 430 and the moving cylinder 423 in which the holder 425 holding the first lens L1 is fixed, are fixed by using the cover member 424. On the one hand, lenses L2-L4 are fixed on the inner cylinder 422 by the adhesive agent B so that the optical axes of lenses L2-L4 are coincident. This inner cylinder 422 is engaged with the lower part 421B adhered on the supporting flat plate 452a to which the image sensor 451 is fitted. Further, the lower end of the upper part 421A and the upper end of the lower part 421B are temporarily fixed.

On such a condition, when the inspection light is incident from the first lens L1, because through lenses L1-L4, it is image-formed on the light receiving surface of the image sensor 451, when the signal from the image sensor 451 is analyzed, the degree of center-axis slippage of the lens L1 and lenses L2-L4 is found. Accordingly, when the upper part 421A is relatively dislocated in the optical axis orthogonal direction to the lower part 421B so that the center-axis slippage is suppressed, because the optical axes of the lens L1 and lenses L2-L4 are coordinated, when while its center-axis adjusting condition is kept, the upper part 421A and the lower part 421B are fixed with together, the center-axis slippage adjustment is completed. Hereupon, such a fixing is not limited to the adhesion by using the adhesive agent, laser welding may also be used.

As a modified example of the present embodiment, in the image taking apparatus 4150 of FIG. 34, by using that the magnet 432 of the actuator 430 and the coil 433 are non-contact, the moving cylinder 423 may also be structured so that it can dislocate in the optical axis orthogonal direction to the screw member 429 (that is, the outer cylinder 421), together with the first lens L1 and the holder 425. More specifically, under the condition that spring members 427, 428 and the moving cylinder 423 can be relatively dislocated, they are temporarily assembled, and after the center-axis slippage of the lens L1 and lenses L2-L4 is adjusted, while the center-axis adjustment condition is kept, the spring members 427, 428 and the moving cylinder 423 can be fixed by using not shown screws. In such a case, there is an advantage that it is not necessary to divide the outer cylinder 421.

Figure 35:
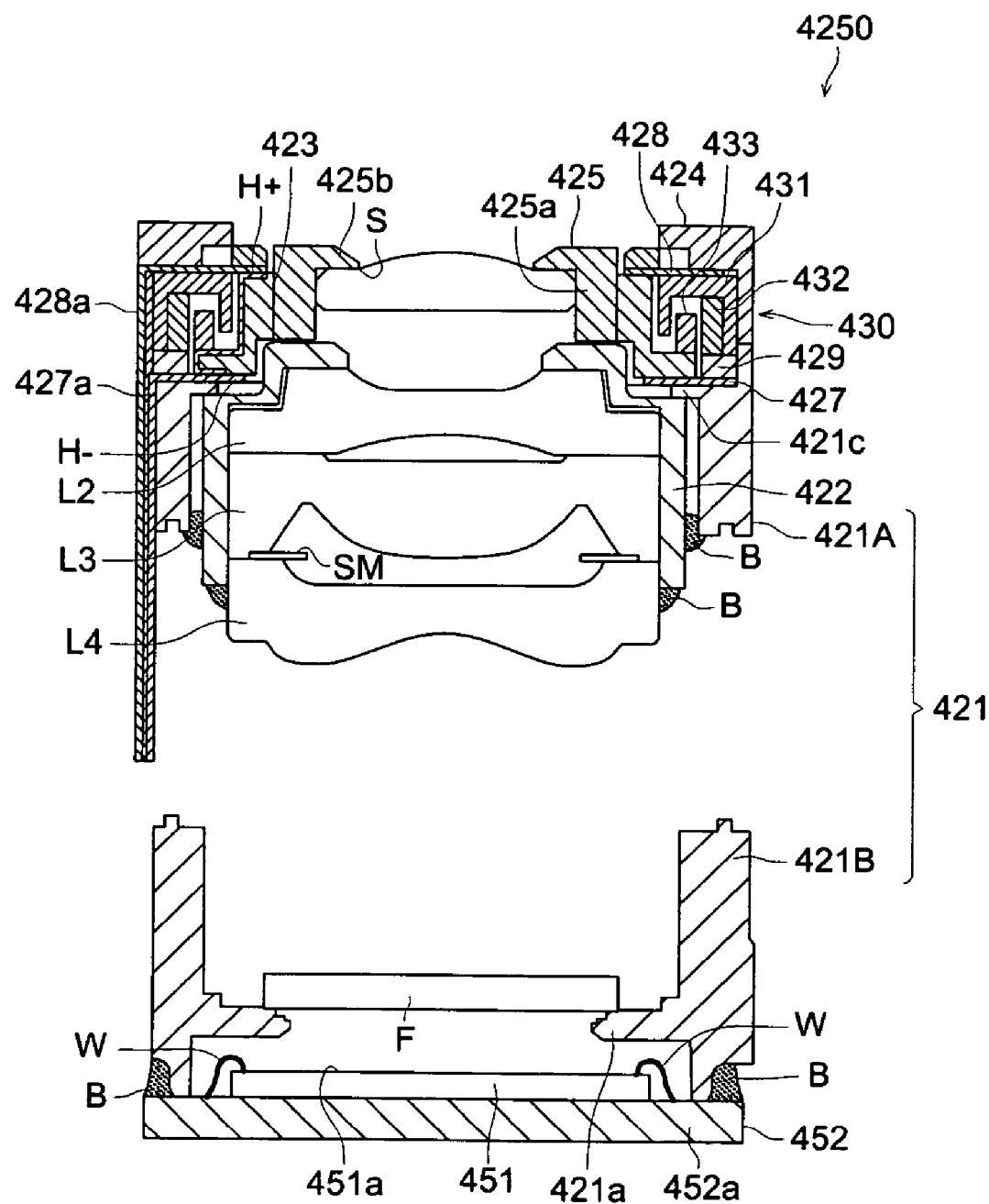
FIG. 35 is a sectional view of an image taking apparatus 4250 according to the tenth embodiment.

FIG. 35 is a sectional view similar to FIG. 32 of the image taking apparatus 4250 according to the 11th embodiment which can be used for the cellular phone 100. Hereupon, the 11th embodiment, in the embodiment shown in FIG. 32, FIG. 33, to the common structure, the same sign is given and the explanation will be omitted.

In FIG. 35, the outer cylinder 421 comprises 2 parts of the upper part 421A and the lower part 421B. Further, in the present embodiment, the pressing member is not provided, the first lens L1 is directly fixed to the holder 425. In the center of the flange part 425b formed on the image side of the holder 425, the aperture stop S is formed. It is structured that the inner cylinder 422 is not engaged with the lower part 421B, but fixed in the upper part 421A. Hereupon, between the outer peripheral surface of the inner cylinder 422 and the inner peripheral surface of the moving cylinder 423, a gap more than 100 μm, is provided.

The assembling method of the image taking apparatus 4250 according to the present embodiment will be described below. Initially, to the upper end of the upper part 421A of the outer cylinder 421, the actuator 430 and the moving cylinder 423 in which the holder 425 holding the first lens L1 is fixed, are fixed by using the cover member 424. Further, lenses L2-L4 are fixed on the inner cylinder 422 by the adhesive agent B so that the optical axes of lenses L2-L4 are coincident. By the not shown tool, the flange part 421c protruded from its inner peripheral surface to the upper part 421A placed so that the first lens L1 side becomes below, (that is, on the state in which FIG. 35 is upside-down), the second lens L2 side end surface of this inner cylinder 422 is bottomed, and on the temporarily assembled condition, it is placed on the not shown inspection apparatus with the image sensor.

On such a condition, when the inspection light is incident from the first lens L1, because through lenses L1-L4, it is image-formed on the light receiving surface of the image sensor, when the signal from the image sensor is analyzed, the degree of center-axis slippage of the lens L1 and lenses L2-L4 is found. Accordingly, when the inner cylinder 422 is relatively dislocated in the optical axis orthogonal direction to the upper part 421A, so that the center-axis slippage is suppressed, because the optical axes of the lens L1 and lenses L2-L4 are coordinated, when while its center-axis adjusting condition is kept, the inner cylinder 422 is adhered and fixed to the upper part 421A by the adhesive agent B, the center-axis slippage adjustment is completed. Hereupon, such a fixing is not limited to the adhesion by using the adhesive agent, laser welding may also be used.

After that, the upper part 421A to which the inner cylinder 422 is fixed, is taken out of the not shown inspection apparatus, and when the top and the bottom are reversed so that the first lens L1 side becomes above, and fixed to the upper end of the lower part 421B adhered onto the supporting flat plate 452a to which the image sensor 451 is fitted, the assembling is completed.

As described above, referring to the embodiments, the present invention is described, however, the present invention should not be construed by limiting to the above embodiments, but it is of course that appropriate change and improvement are possible. For example, as the actuator, also other than exemplified above embodiments, various drive sources including the electric active element of, for example, Japanese translation of PCT international application No. JP 2004-530172 can be used.

What is claimed is:

1. An image taking apparatus comprising:
   an image taking lens having a plurality of lenses; and
   a solid-state image sensor,
   wherein the image taking lens comprises a most image side lens positioned on the most image side whose effective diameter is larger than the effective diameter of any other lens of the image taking lens;
   wherein the image taking apparatus is structured to conduct focusing by moving all lenses of the image taking lens including the most image side lens in the optical axis direction as a focusing lens; and
   wherein at least one part of an actuator for driving the focusing lens moving at the time of focusing is arranged in the space generated on the periphery of a minimum lens, whose effective diameter is minimum of the image taking lens, by the difference of the outer diameter of the minimum lens and the outer diameter of the most image side lens.

2. The image taking apparatus of claim 1, wherein the image taking lens has a first lens having positive refractive power on the most object side, and the minimum lens is the first lens.

3. The image taking apparatus of claim 2, wherein the image taking lens has an aperture stop on an object side of the first lens.

4. The image taking apparatus of claim 1, wherein a guide part for guiding the movement of the focusing lens is arranged on the solid-state image sensor side from the actuator.

5. The image taking apparatus of claim 1, wherein, when a cylinder surface formed on the periphery of the most image side lens of a moving and holding part for holding the focusing lens is movably engaged with a guide cylindrical surface of a fixed member, the focusing lens is guided in the optical axis direction.

6. The image taking apparatus of claim 1, wherein the actuator includes a voice coil motor.

7. The image taking apparatus of claim 1, wherein the actuator includes a shape memory alloy.

8. The image taking apparatus of claim 1, characterized in that: the image taking apparatus comprises a substrate which holds the solid-state image sensor and includes a terminal for the external connection for sending and receiving the electric signal, and a casing having an aperture part for light incidence from the object side are integrally formed, and the height of the image taking lens optical axis direction in the image taking apparatus is less than 10 (mm).

9. The image taking apparatus of claim 1, wherein the image taking apparatus is structured to conduct focusing by moving all lenses of the image taking lens without changing the mutual lens distances of all the lenses.

10. An image taking apparatus comprising:
    an image taking lens having a plurality of lenses; and
    a solid-state image sensor,
    wherein
    the image taking lens comprises a first lens having positive refractive power and positioned on the most object side where the diameter of the first lens has a minimum effective diameter, and a most image side lens positioned on the most image side, the most image side lens having an effective diameter larger than the effective diameter of any other lens of the image taking lens;
    wherein the image taking apparatus is optimized to conduct focusing by changing at least one of lens intervals formed between lenses of the plurality of lenses composing the image taking lens;
    wherein at least one part of an actuator for driving the focusing lens moving at the time of focusing is arranged in the space generated on the periphery of the first lens by the difference of the outer diameter of the minimum lens and the outer diameter of the most image side lens; and
    wherein the first lens is in a fixed position to the solid image sensor, and the first lens is structured so that focusing is carried out when all lenses positioned on the image side from the first lens are moved as a focusing lens group to the first lens, and a guide part for guiding the movement of the focusing lens group is positioned on the solid-state image sensor side from the actuator for focusing.

11. An image taking apparatus comprising:
an image taking lens having a plurality of lenses; and
a solid-state image sensor,
wherein the image taking lens comprises a most image side lens positioned on the most image side, the most image side lens has an effective diameter larger than the effective diameter of any other lens of the image taking lens;
wherein the image taking apparatus is structured to conduct focusing by moving a focusing lens including at least a first lens of the image taking lens positioned on the most object side in the optical axis direction to a fixed lens in the image taking lens; and
wherein the focusing lens and the fixed lens are center-axis adjustable when assembling;
wherein, in a space generated on the periphery of the first lens by the difference of the outer diameter of the first lens and the most image side lens, at least one part of a focus actuator for driving the focusing lens moving at the time of focusing, is arranged; and
wherein the focusing lens is having only the first lens, and the center-axis adjustment is carried out when the focus actuator and the first lens are integrally dislocated in the direction crossing the optical axis to the fixed lens.

12. An image taking apparatus comprising:
an image taking lens having a plurality of lenses; and
a solid-state image sensor,
wherein the image taking lens comprises a most image side lens positioned on the most image side, the most image side lens has an effective diameter larger than the effective diameter of any other lens of the image taking lens;
wherein the image taking apparatus is structured to conduct focusing by moving a focusing lens including at least a first lens of the image taking lens positioned on the most object side in the optical axis direction to a fixed lens in the image taking lens;
wherein the focusing lens and the fixed lens are center-axis adjustable when assembling;
wherein, in a space generated on the periphery of the first lens by the difference of the outer diameter of the first lens and the most image side lens, at least one part of a focus actuator for driving the focusing lens moving at the time of focusing, is arranged; and
wherein the focusing lens is composed of only the first lens, and the center-axis adjustment is carried out when the first lens is dislocated against a holding frame holding the first lens in the direction crossing the optical axis.

13. An assembling method of the image taking apparatus, which comprises an image taking lens having a plurality of lenses and the solid-state image sensor, comprising steps of:
disposing a fixed lens in a first holding member;
disposing a focusing lens in a second holding member;
moving the first holding member relative to the second holding member to adjust the position of the fixed lens on a center-axis so that the fixed lens and the focusing lens share the same optical axis; and
fixing the first holding member to the second holding member after the position of the fixed lens on the center-axis has been adjusted;
wherein the image taking lens comprises a most image side lens positioned on the most image side whose effective diameter is larger than the effective diameter of any other lens of the image taking lens;
wherein the image taking apparatus is structured to conduct focusing by moving a focusing lens including at least a first lens of the image taking lens positioned on the most object side in the optical axis direction to a fixed lens in the image taking lens; and
wherein the focusing lens is composed of only the first lens, and the center-axis adjustment is carried out when the focus actuator and the first lens are integrally dislocated in the direction crossing the optical axis to the fixed lens.

14. An assembling method of the image taking apparatus, which comprises an image taking lens having a plurality of lenses and the solid-state image sensor, comprising step of:
disposing a fixed lens in a first holding member;
disposing a focusing lens in a second holding member;
moving the first holding member relative to the second holding member to adjust the position of the fixed lens on a center-axis so that the fixed lens and the focusing lens share the same optical axis; and
fixing the first holding member to the second holding member after the position of the fixed lens on the center-axis has been adjusted;
wherein the image taking lens comprises a most image side lens positioned on the most image side whose effective diameter is larger than the effective diameter of any other lens of the image taking lens;
wherein the image taking apparatus is structured to conduct focusing by moving a focusing lens including at least a first lens of the image taking lens positioned on the most object side in the optical axis direction to a fixed lens in the image taking lens; and
wherein the focusing lens is composed of only the first lens, and the center-axis adjustment is carried out when the first lens is dislocated against a holding frame holding the first lens in the direction crossing the optical axis.

* * * * *

UNITED STATES PATENT AND TRADEMARK OFFICE
CERTIFICATE OF CORRECTION

| | | |
|---|---|---|
| PATENT NO. | : 7,613,389 B2 | Page 1 of 1 |
| APPLICATION NO. | : 11/499906 | |
| DATED | : November 3, 2009 | |
| INVENTOR(S) | : Suzuki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 541 days.

Signed and Sealed this

Nineteenth Day of October, 2010

David J. Kappos
*Director of the United States Patent and Trademark Office*